(12) United States Patent
Itou et al.

(10) Patent No.: US 6,556,260 B1
(45) Date of Patent: Apr. 29, 2003

(54) LIQUID CRYSTAL DISPLAY APPARATUS

(75) Inventors: Osamu Itou, Hitachi (JP); Shinichi Komura, Hitachi (JP); Ikuo Hiyama, Hitachi (JP); Masaya Adachi, Hitachi (JP); Shoichi Hirota, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/526,205

(22) Filed: Mar. 15, 2000

(30) Foreign Application Priority Data

Mar. 17, 1999 (JP) .......................................... 11-072032

(51) Int. Cl.[7] ...................... G02F 1/1335; G02F 1/1337
(52) U.S. Cl. ...................... 349/69; 349/106; 349/113
(58) Field of Search .......................... 349/69, 70, 71, 349/106, 113, 141; 313/500, 503, 505, 509, 510; 315/169.3

(56) References Cited

U.S. PATENT DOCUMENTS 5,504,599 A * 4/1996 Okibayashi et al. .......... 349/69
5,612,803 A * 3/1997 Yamada et al. ............. 349/188
6,025,894 A * 2/2000 Shirasaki et al. ............ 349/69

FOREIGN PATENT DOCUMENTS

| JP | 10-268306 | 9/1998 |
| JP | 10-268308 | 9/1998 |
| JP | 10-213799 | 11/1998 |

* cited by examiner

*Primary Examiner*—Robert H. Kim
*Assistant Examiner*—Tai Duong
(74) *Attorney, Agent, or Firm*—Antonelli, Terry, Stout & Kraus, LLP

(57) ABSTRACT

A liquid crystal display apparatus featuring an excellent contrast ratio even though it is a reflection type liquid crystal display unit. The display apparatus includes a: liquid crystal layer; upper and lower substrates for interposing the liquid crystal layer therebetween; reflection plate for reflecting light which passes through the liquid crystal layer back to the liquid crystal layer; and light emitting element layer for emitting light to the liquid crystal layer, and wherein light emitting element layer is arranged above liquid crystal layer so as to surround the display portion of the liquid crystal layer. Further, the light emitting element layer is provided with a reflection layer for deflecting light emitted in the upper direction back to liquid crystal layer.

21 Claims, 15 Drawing Sheets

(a)

(b)

(c)

(d)

(e)

(f)

LIQUID CRYSTAL DISPLAY APPARATUS

BACKGROUND OF THE INVENTION

The present invention relates to a liquid crystal display apparatus and, in particular, to a reflection type liquid crystal display apparatus, which features low power consumption, is light in weight and has a reduced thickness.

In order to provide an electronics device having multi-functions which is able to operate smoothly, the provision of an interface device therefor is becoming more and more important. A liquid crystal display apparatus which has a reduced-thickness, is light in weight, has a low power consumption and can be installed without need of a large modification of the arrangement of its electronics device, will be most suitable as an interface.

Recently, in order to realize a low power consumption in devices, reflection-type color liquid crystal display apparatuses have become available on the market. Because these reflection-type color liquid crystal display apparatuses use external light to enhance their display by reflecting this external light, low power consumption can be expected. However, there is a problem in that, although a good display can be obtained in a bright environment, such as a sunny outdoor area or the like, the display produced by such an apparatus becomes hardly visible in a dark indoor environment with a dim illumination or the like where visibility is substantially reduced. More specifically, among such reflection-type color liquid crystal display devices, there are a mono-polarization type that uses a single polarization plate, a guest-host type that uses a dichromatic pigment-added liquid crystal layer, and others; however, the reflectance and the contrast ratio of any of these devices are lower than those of a printed color copy or the like, and their visibility tends to drop in a dark environment. Even if a reflection-type color liquid crystal display device having the same or better reflectance and contrast ratio as those of printed matter is realized, it is inevitable for its visibility to tend to drop in a darker environment.

Therefore, in order to improve the visibility of a produced display in a dark environment, provision of an auxiliary light source is essential in a reflection-type color liquid crystal display device. In a conventional reflection type color liquid crystal display device, an auxiliary light source, which is referred to as a front light, is provided. As viewed from the user, in an arrangement of a liquid crystal display device having a first substrate near to the user and a second substrate remote therefrom for retaining a liquid crystal layer therebetween, the front light is provided in the upper direction of the first substrate toward the user, and the source of this light is comprised of a fluorescent lamp and a light guide plate. The light guide plate is comprised of a material having a larger refractive index than that of air, and is disposed to surround the whole surface of the first substrate. While the bottom surface of the light guide is disposed in parallel with the first substrate, the upper surface thereof is inclined to form an interface with the air. The fluorescent lamp is disposed on the side of the light guide plate, and light emitted therefrom enters the light guide plate. A component of light which has entered into the light guide plate, and which propagates in parallel with the bottom surface of the light guide plate, reaches the upper surface of the light guide plate, then is reflected due to a difference in refractive indexes between the light guide plate and the air in a direction of the first substrate so as to illuminate the liquid crystal display portion.

Further, in the prior art reflection type color liquid crystal display device, an arrangement for enabling a color display is known wherein color filters are used in the same manner as in a transmission type color liquid crystal display apparatus. In this case, in order to improve its brightness when an auxiliary light source is not used, a hypochromic filter is used as the color filter in this reflection type color liquid crystal display device.

The above-mentioned front light is described, for example, in JPA Nos. 10-268308 and 10-268306.

Further, JPA No. 10-213799 discloses a liquid crystal display apparatus wherein a flat auxiliary light source which surrounds the whole area of the liquid crystal display is provided. This auxiliary light source is a transparent light source, and an example using electroluminescence elements is disclosed wherein a transparent electrode is used for its electrode. This auxiliary light source is disposed to surround the whole area of the first substrate, and its light of emission directly illuminates the liquid crystal display portion. Also, external light is allowed to reach the display portion, which light is transmitted through the transparent electrode of the auxiliary light source and its light emitting layer.

Because a photoconductor of the conventional front light is as thick as 3 mm or more, it fails to satisfy the features of reduced thickness and lightness in weight called for by the invention. Further, there is a problem in that, because the photoconductor of the front light reflects external light incident on its upper surface, the contrast ratio drops. Further, when it is attempted to manufacture a liquid crystal display device in combination with a touch panel, the contrast ratio will drop further due to an increased number of interfaces with the air.

As for the front light of this type of display device, although it is ideal for the light of a fluorescent lamp to propagate in parallel with the bottom surface of the light guide plate, there actually exists a component of light that does not propagate in such a manner. Further, reflection of light on the upper surface of the light guide plate utilizes a difference of refractive indexes between the light guide plate and the air, and, therefore, its reflectance is low. Therefore, the light utilization efficiency of the front light is not high. Thereby, in order to achieve a sufficient brightness, the intensity of the fluorescent lamp must be increased. Although use of the front light is limited mainly in a dark environment, if the power consumption is increased in order to increase the brightness of the fluorescent lamp, it becomes impossible to satisfy the desire for low power consumption in a reflective color liquid crystal display.

On the other hand, an auxiliary light source of a flat type, as disclosed in JPA-10-213799, which covers the whole surface of a liquid crystal display unit, emits light not only in the direction of its liquid crystal layer, but also in the direction of the user. Thereby, because the light advancing directly toward the user does not undergo modulation by the liquid crystal display unit, the contrast ratio of the display drops.

As described above, the auxiliary light of a conventional type has such problems that it detracts from the advantages of the reflection type color liquid crystal display apparatus of being thin, light-weight and having a low power consumption, not to mention the fact that its contrast ratio is reduced.

Further, because the reflection type color liquid crystal display device needs to use hypochromic color filters as described above, and because the hypochromic color filters are a color filter that has a smaller quantity of color pigments than usual ones, there is such a problem in that, although it features a higher light transmittance than the color filter for a transmission type color liquid crystal display apparatus, it has a lower color purity.

Generally, in the case of the reflection type color liquid crystal display device that uses color filters, the color purity of the display colors is determined by a product between a square of the transmission spectrum of its color filter and its emission spectrum. Therefore, because hypochromic filters are used in the reflection type color liquid crystal display device, when white light is used as a light source, the color purity drops substantially in comparison with the transmission type color liquid crystal display apparatus. In case the auxiliary light source is not turned on in the reflection type color liquid crystal display device, external light incident from the surrounding area becomes its light source, and because most of external light is white light, the color purity of the displayed colors is low. Further, because the conventional front light is white light, even when the auxiliary light is turned on, its color purity remains low.

SUMMARY OF THE INVENTION

An object of the present invention is to solve the above problems associated with conventional display devices and provide for a liquid crystal display apparatus that can achieve a higher contrast ratio notwithstanding the fact that it is a reflection type liquid crystal display device.

In order to achieve the above object, a novel liquid crystal display apparatus according to the invention is provided.

Namely, a liquid crystal display apparatus of the invention is comprised of a liquid crystal layer, upper and lower substrates that hold the liquid crystal layer therebetween, a reflection plate disposed beneath the liquid crystal layer for reflecting light emitted from above the liquid crystal layer and which is transmitted therethrough, and a light emitting element layer for emitting light to the liquid crystal layer, wherein the light emitting element layer is disposed above the liquid crystal layer in such a manner as to surround the display portion of the liquid crystal layer, and the light emitting element layer is provided with a reflecting layer for deflecting light emitted in an upper direction back to the liquid crystal layer.

BRIEF DESCRIPTION OF THE DRAWINGS

The above and other objects, advantages and features of the invention will become more apparent from the following description when taken with reference to the accompanying drawings, in which.

PREFERRED EMBODIMENTS OF THE INVENTION

An embodiment of the invention will be described with reference to the accompanying drawings.

Firstly, a structure of a reflection type liquid crystal display apparatus according to one embodiment of the invention will be described with reference to FIG. 1.

Figure 1:
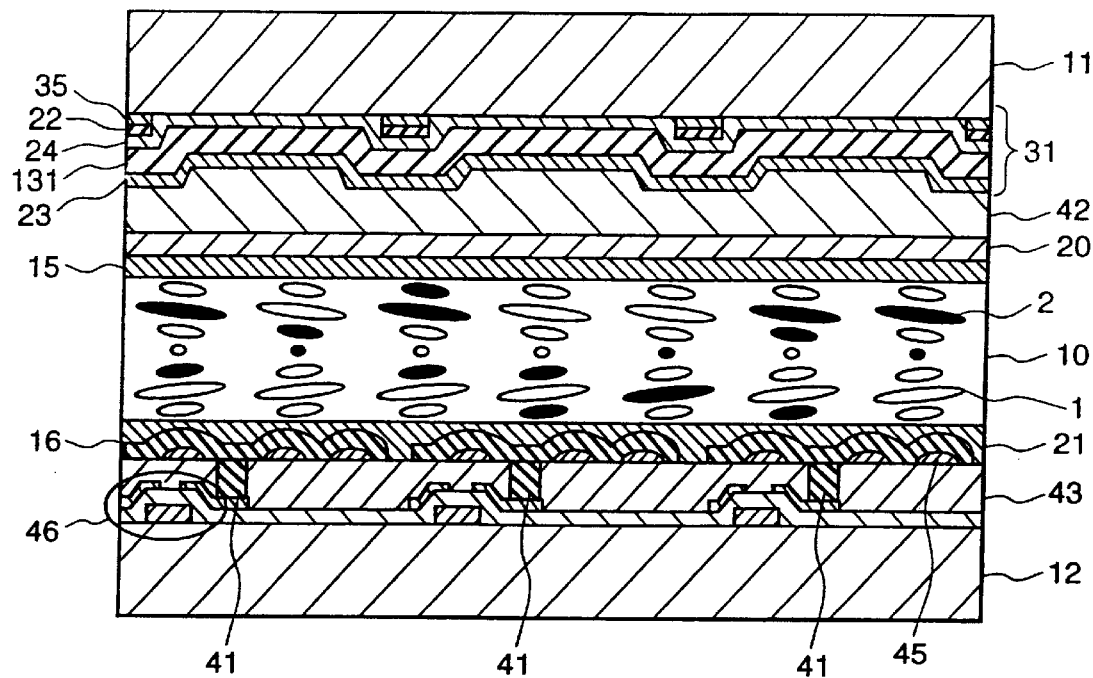
FIG. 1 depicts a schematic cross-section of a liquid crystal display apparatus representing one embodiment of the invention.

As shown in FIG. 1, this reflection type liquid crystal display apparatus has a liquid crystal layer 10 that is held between a first substrate 11 and a second substrate 12. The second substrate 12 is provided with a reflecting electrode 21 that functions both as a reflecting plate and an electrode, and has an active element 46 for supplying a voltage to the reflecting electrode 21, which is disposed on the surface thereof facing toward liquid crystal layer 10. The first substrate 11 is provided with a flat light source 31 on the surface thereof facing toward the liquid crystal layer 10.

Figure 3:
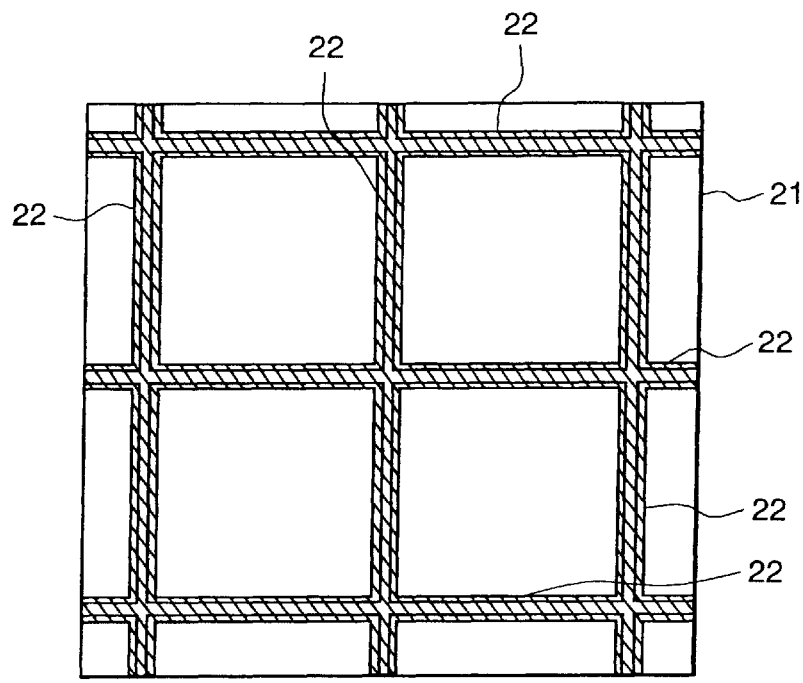
FIG. 3 is a diagram which depicts patterns and positions of the first electrode 22 for a light source and reflector electrode 21 in the liquid crystal display apparatus of the invention as observed from the normal direction of substrate 11.

Flat light source 31 has a laminated structure, and some portions of the laminated structure (layers 35, 22) are opaque. Opaque layers 35 and 22 are provided in such a manner that they do not completely cover the whole surface of the display area, but surround only a portion thereof. In the structure of FIG. 1, the layers 35 and 22 are disposed in the form of a matrix, mainly around a portion where reflecting electrode 21 is not present, as shown in FIG. 3. Hence, the opaque layers 35 and 22 of the flat light source 31 also function as a black matrix. The pattern of opaque layers 35, 22 may be shaped, in addition to that of a matrix, also into stripe-like or comb teeth-like patterns, for example.

The flat light source 31 emits light in the direction of second substrate 12 positioned opposite thereto, and a component of light emitted in a direction of the first substrate 11 is reflected by layer 22 to return this component in the direction of the second substrate 12. Thereby, most of the light emitted from flat light source 31 is able to pass through the liquid crystal layer 10, thereby ensuring that the light from flat light source 31 will not be emitted directly toward the user.

The layer 35, which is in the vicinity of the first substrate 11, is a reflection prevention layer with a low reflectance, and it prevents external light from being reflected on an upper surface of layer 22 and directed toward the user. This is done because this light of reflection, which does not pass through liquid crystal layer 10, if not prevented from reflecting back to the user, will reduce the contrast ratio.

In flat light source 31, which has a laminated structure, the light emitting layer 131 is disposed nearer to the second substrate 12 than the opaque layers 35 and 22. Flat light source 31 may have the structure, for example, of an electro-luminescence (EL) device. In the case of an EL device, each layer is laminated from the side in the vicinity of the substrate 11 sequentially in the order of the reflection prevention layer 35, the first light source electrode 22, the first dielectric layer 24, the light emission layer 131, and the second light source electrode 23, and wherein the first light source electrode 22 is made of a metal electrode and the second light source electrode 23 is made of a transparent metal oxide electrode. In this construction, because only a bottom portion of the first light source electrode 23 in the light emitting layer 131 is enabled to emit light, a flat light source 31 having a matrix pattern similar to that of the first light source electrode 23 is obtained. A component of light emitted in the direction of the user (toward substrate 11) is reflected by first light source electrode 23 so as to be directed to substrate 12, therefore, a light component that does not pass through liquid crystal layer 10 will not reach the user.

Between flat light source 31 and liquid crystal layer 10, there is provided an insulation layer 42. This insulation layer 42 is more than a simple insulation layer, and is comprised of a transparent resin that contains fine particles for scattering light emitted from flat light source 31.

The flat light source 31 has a surface that is inclined relative to the flat surface of the first substrate 11, as shown in FIGS. 10–13, 23, 26, and 27–30, such that light is emitted therefrom mainly in the direction that is inclined relative to a direction of a normal line of the first substrate 11. In order to incline the flat light source 31 as described above, for example, a matrix-like, stripe-like or comb-teeth-like structure that has a slanted surface may be formed on the surface of the first substrate, and then a flat light source is formed on this slanted surface. In order to form a structure with an inclination, for example, a method of etching a silicon nitride film with an etching solution that has a low selectivity may be used.

Figure 23:
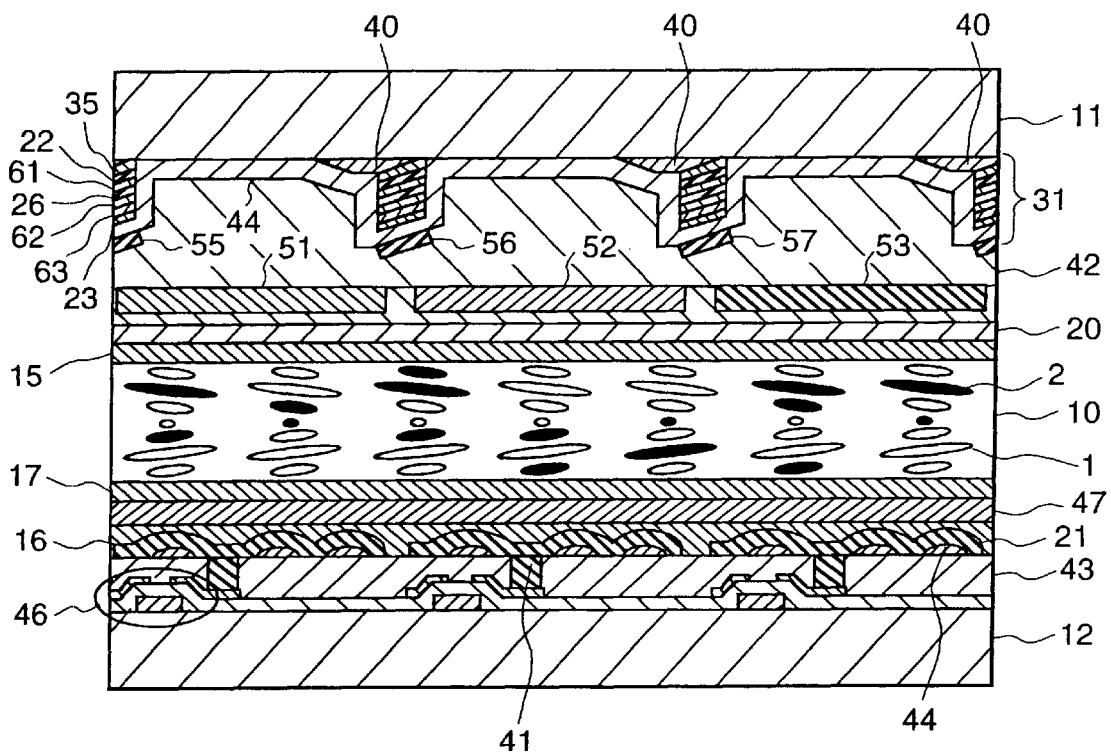
FIG. 23 is a cross-sectional view of a liquid crystal display apparatus according to the fifteenth embodiment of the invention.

The flat light source 31 may be a chromolight source or white light source. In case the flat light source 31 is chromolight, it may be arranged as shown in FIG. 23 wherein color filters B (blue), G (green) and R (red) are arranged between flat light source 31 and liquid crystal layer 10, and wherein luminous species that constitute light emitting layer 26 in flat light source 31 may be selected in accordance with a color of each one of the respective color filters 51, 52 and 53 disposed in the proximity thereof. Namely, in light emitting layer 26 of flat light source 31 in proximity to the green color filter 52, a luminous species that emits a green color is included. As for the blue and red color filters 53 and 52, in the same manner, their luminous species are included. At this time, as indicated in FIG. 23, by utilizing each inclination of flat light source 31, each light from flat light source 31 can be selectively directed mainly toward one of the color filters corresponding thereto.

As for the shape of the reflecting electrode 21, in order to prevent the background light around the user from reflecting on the mirror surface toward the user, it is preferable for the reflecting electrode to have irregularities on its surface. At this time, it may be formed such that a normal line of each surface of the irregularities thereof is inclined toward a main portion of the flat light source 31 in proximity and corresponding thereto. Further, it may be arranged such that a normal line of each surface of the irregularities bisects an angle between a line in a direction of the main plane portion of the flat light source in proximity thereto and a line in a direction of a normal line of the substrate.

In case color filters are used, the irregularities thereof may be formed such that a normal line of each surface of the irregularities is inclined toward the main plane portion of the flat light source corresponding to its color filter. Further, it may be formed such that the normal line of each surface of the irregularities bisects an angle between the direction toward its main portion of the flat light source and the normal line direction of the substrate.

In the reflecting type liquid crystal display apparatus according to this embodiment of the invention described above, because the flat light source is disposed between substrate 11 and liquid crystal layer 10, and because there occurs no loss to light due to light transmission as in the conventional front light type, there can be provided an excellent auxiliary light source featuring a high light utilization efficiency. Thereby, the power consumption in use of the auxiliary light source can be reduced substantially. Further, because the thickness of the auxiliary light source can be reduced to about 100 μm, in comparison with 3 mm in the conventional type, a more compact and thinner type apparatus can be provided.

Further, in case the flat light source 31 uses, for example, organic EL elements, by providing a construction in which the first light source electrode 22 is made of a metal electrode and the second light source 23 is made of a transparent electrode, such as a metal oxide electrode, it may be ensured that a component of light emitted toward substrate 11 is reflected by light source electrode 22 so as to be directed toward the second substrate 12. On the other hand, because the other component of light emitted from flat light source 31 toward substrate 12 is directed so as to be emitted to substrate 12, it can be ensured that the flat light source 31 will emit its light mainly in the direction of substrate 12. When this light is reflected on the reflecting electrode 21 mounted on the second substrate 12, the light emitted from flat light source 31 passes for the second time through liquid crystal layer 10, similar to the case of an external light reflection, before it reaches the user.

Because opaque layers 35 and 22 of respective layers that constitute the flat light source 31 are disposed at a position opposite to a gap of display pixels (each corresponding to a pattern of reflecting electrode 21) of liquid crystal layer 1, even if the flat light source 31 is interposed between the liquid crystal layer 10 and the first substrate, a high numerical aperture can be achieved, thereby ensuring that a high brightness will be obtained even if the liquid crystal display apparatus is used in a bright environment without turning on the flat light source 31.

Further, a portion of light emitting layer 131 of the flat light source 31, from which light is emitted, corresponds to the pattern of the first light source electrode 22, as described above; therefore, its light emitting portion is small in comparison with the size of a pixel, and it is distributed sparsely over a gap of pixels corresponding thereto. For example, if one pixel (in appearance over a reflecting electrode) is formed to have a size of 85 μm×285 μm, the width of the light emitting portion (the width of the first light source electrode 22) can be made approximately 15 μm. Hence, if the flat light source 31 is separated sufficiently from liquid crystal layer 10, and if the light emitted from the flat light source 31 is scattered sufficiently before it reaches the reflecting electrode 21, a wider area of the pixel can be illuminated efficiently. For example, by interposing insulation layer 42 between flat light source 31 and liquid crystal layer 10, wherein this insulation layer 42 is more than a simple insulation layer and is made of a transparent resin containing fine particles for scattering light, the light emitted from flat light source 31 can be scattered widely by this insulation layer 42, thereby ensuring a wider area of the display pixel of the liquid crystal layer 10 to be illuminated.

Also, in a case where the flat light source 31 is disposed to be inclined relative to the main surface of the first substrate 11, and to emit its light mainly in a slanted direction relative to a normal line direction of the first substrate 11, a broader pixel area of the liquid crystal layer can be illuminated.

Further, when organic EL elements are used for the flat light source 31, light emission can occur by applying a voltage of about 5 V across the first light source electrode 22 and the second light source electrode 23. When inorganic EL elements are used, light emission can occur by applying a voltage of about 100 V across the first light source electrode 22 and the second light source electrode 23. By provision of a sufficient insulation between the flat light source 31 and the liquid crystal layer 10, it can be ensured that the liquid crystal layer 10 will not be affected by an electric field that is generated around the flat light source 31. By interposing insulation layer 42 between the flat light source 31 and the liquid crystal layer 10, as described above, the electric field generated around the flat light source 31 can be cut off.

In the case where the flat light source 31 is made of a chromolight source, color filters are placed between the flat light source 31 and the liquid crystal layer 10, and where its luminous species, which constitutes the light emitting layer of the flat light source 31, is selected corresponding to the color of a filter disposed in the proximity thereof, absorption of light emitted from the flat light source 31 by the color filters can be reduced substantially, thereby enabling a maximum utilization of light.

As described above regarding conventional display devices, in the case of a reflecting type color liquid crystal display apparatus that uses color filters, the color purity of its displayed color is determined by a product between the emission spectrum of its light source and a square of the transmission spectrum of its color filter. Hence, if the flat light source 31 is a chromolight source having a high color purity, its color purity when the flat light source is turned on can be increased substantially in contrast where a white light source is used, thereby ensuring a color purity similar to that of the transmission type color liquid crystal display to be obtained.

Even in a case where a chromolight source having a high color purity is used as its flat light source, it is effective to incline the flat light source 31 with respect to the main surface of the first substrate 11. Thereby, since it becomes possible to direct the light of emission selectively to its corresponding color filter, the color purity when the f lat light source 31 is turned on can be improved further.

Usually, the user observes the liquid crystal display unit from a direction along a normal line of the substrate 11. In the liquid crystal display unit according to this embodiment of the invention, the flat light source 31 is arranged to emit its light toward reflecting electrode 21 via its slanted surface in a direction that is inclined relative to the normal line of substrate 11. Hence, by forming irregularities on the mirror surface of the reflecting electrode 21 and regulating each shape of these irregularities appropriately, it becomes possible to reflect as much the rays of the flat light source as possible in the direction of the normal line of the substrate, i.e. along the direction on which the user observes the display. By forming the irregularities such that a normal line of each surface of the irregularities is inclined to be directed to its nearest flat light source 31, it becomes possible to reflect as much of the rays of the flat light source as possible along the direction of the normal line of the substrate 11. Still further, it is most ideal to form the irregularities such that a normal line of each portion of the irregularities bisects an angle between a line drawn in a direction of the nearest portion of the flat light source 31 and a line drawn in a direction of a normal line of the substrate 11. In this case, because the rays of the flat light source 31 are reflected by mirror reflection in the direction of the normal line of the substrate 11, most of the light emitted from flat light source 31 can be reflected in the directions of the normal line of the substrate 11.

Even in a case where a chromolight source having a high color purity is used as the flat light source 31, provision of irregularities on the reflecting surface of the reflecting electrode 21 will be effective. In this case, the color purity obtained when the flat light source is turned on can be further improved by designing patterns of irregularities such that light, which has passed through a corresponding color filter, is reflected in the direction of the normal line of the substrate, i.e. in the direction which the user observes the display.

The features and advantages attained by the embodiments of the invention will be described more specifically with reference to the accompanying drawings.

Embodiment 1

A liquid crystal display apparatus according to a first embodiment of the invention will be described with reference to FIG. 1.

The liquid crystal display unit according to the first embodiment of the invention is provided with a pair of substrates 11 and 12 as indicated in FIG. 1.

A first substrate 11 of the pair of substrates 11 and 12 is made of borosilicate glass and is 0.7 mm thick. On the surface of substrate 11 facing the liquid crystal layer 10, there are sequentially laminated a flat light source 31, a first insulation layer 42, and a common electrode 20. On the other hand, the second substrate 12 is made of the same material and has the same thickness, and on the surface of the second substrate 12, there are mounted a reflecting electrode 21, active elements 46 and so on.

Flat light source 31 has a laminated structure, which includes, sequentially from the side in proximity to the first substrate 11, an antireflection layer 35, a first light source electrode 22, first dielectric layer 24, light emitting layer 131, and second light source electrode 23. The antireflection layer 35 is made of aluminum oxide, and the thickness of this layer is 0.2 $\mu$m. The first light source electrode 22 is made of aluminum and the thickness of this layer is 1.0 $\mu$m. By way of example, antireflection layer 35 may be made of chrome oxide and the first light source electrode 22 may be made of chromium. Further, antireflection layer 35 may also be made of a light absorption material, such as metal oxides or pigments, and the first light source electrode 22 may also be made of other metals.

Among respective layers constituting flat light source 31, antireflection layer 35 and first light source electrode 22 do not transmit visual rays, but all of the first dielectric layer 24, light emitting layer 131 and second electrode 23 are transparent to visual rays. Further, the first light source electrode 22 is formed to have a matrix pattern with two pairs of stripes crossed orthogonal as observed from a direction of the normal line of substrate 11. The width of the stripe of the first light source electrode 22 is 35 $\mu$m, and the width of a portion between two stripes is 265 $\mu$m. The antireflection layer 35, when observed from the normal line direction of substrate 11, has the same pattern as that of the first light source electrode 22, and is disposed to overlap the first light source electrode 22.

Light emitting layer 131 is comprised of an organic binder that contains a powder of a fluorescent substance, and the thickness of this layer is 50 $\mu$m. For this fluorescent substance, a powder of ZnS with addition of Mn is used in this embodiment of the invention, and its particle size is distributed in a range from about 5 $\mu$m to 20 $\mu$m. Cyanoethyl cellulose is used as its organic binder.

The first dielectric layer 24 is made of $SiO_2$, and the thickness of this layer is 10 $\mu$m. However, it is not limited thereto, and first dielectric layer 24 may also be made of $Y_2O_3$, $Al_2O_3$, $Ta_2O_5$, $Si_3N_4$ or a ferroelectric substance such as $BaTiO_3$, $PbTiO_3$ or the like.

The second light source electrode 23 is made of ITO, and the thickness of this layer is 0.2 $\mu$m.

Figure 2:
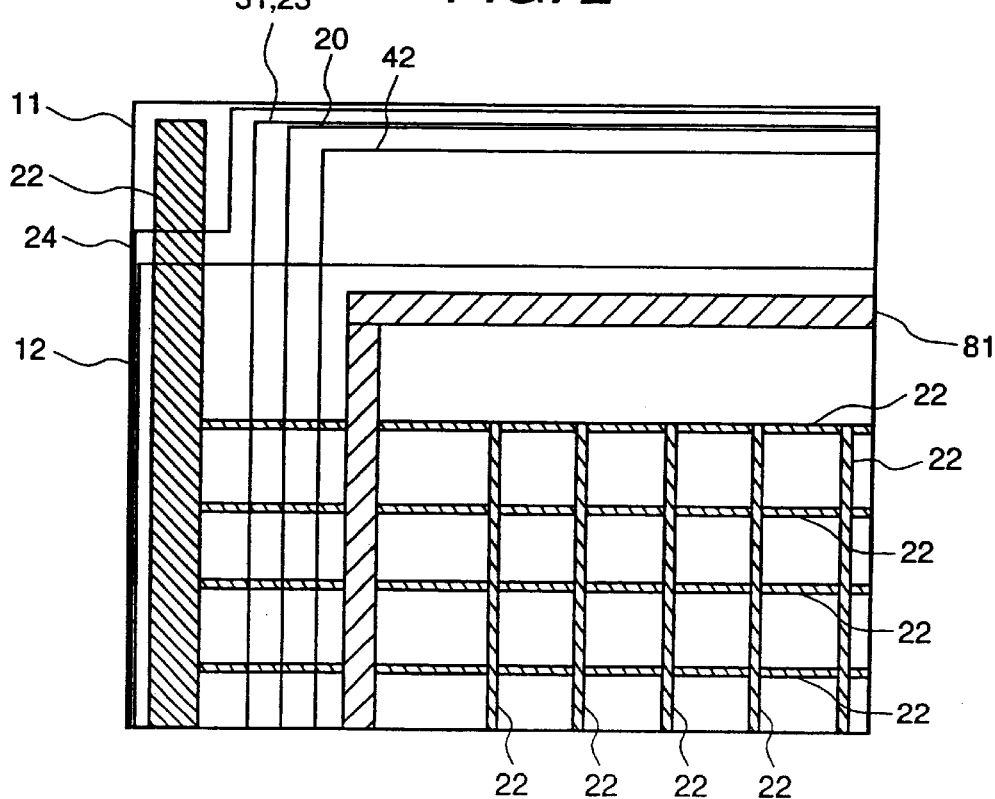
FIG. 2 is a diagram which depicts patterns, at an end of a first substrate 11, of first electrode 22 for the first light source, light emitting layer 131, dielectric substance layer 24, and second electrode 23, in the liquid crystal display of FIG. 1.

FIG. 2 shows respective patterns and layouts of the first light source electrode 22, the light emitting layer 131, the first dielectric layer 24 and the second light source electrode 23 in a corner portion of the first substrate 11. All of the exposed portions of the first light source electrode 22, the second light source electrode 23 and the common electrode 20 are placed outside of a seal portion 81 that seals the liquid crystal layer 10. In addition, because all of these three elements are separated sufficiently from each other, an electric field can be applied across the first light source electrode 22 and the second light source electrode 23, while preventing a short circuit therebetween. In an arrangement of light source 31, according to this embodiment of the invention, when an ac electric field of approximately 100 V effective is applied across the first and the second light source electrodes 22 and 23, a light can be emitted in a range from 550 nm to 650 nm.

The first insulation layer 42 uses an organic high polymer film of the acrylic group, and the thickness of this film is about 100 $\mu$m. Common electrode 20 is made of ITC, and the thickness of this film is 0.2 $\mu$m. Further, as a first orientation film 15, a polyimide film made by Nissan Kagaku K.K. is used.

Reflecting electrode 21 provided on the second substrate 12 is made of Al, and the thickness of this layer is 2000 Å. Active element 46 is a thin film transistor of a reverse staggered-type. Reflecting electrode 21 has two functions, one as a reflector plate for reflecting light coming from a direction of the substrate 11 passing through liquid crystal layer 10, and the other one for switching the liquid crystal layer 10 on and off between a bright display (on) state to enable light transmission and a dark display (off) state to block light transmission. A plurality of portions of reflecting electrode 21 are formed in a prescribed pattern and disposed in a matrix arrangement, each separated from one another. The number of these portions is 480 pieces in a vertical direction and 640 pieces in a horizontal direction. Each of the plurality of portions of reflecting electrode 21 corresponding to one unit of the matrix constitutes one pixel. Here, reflecting electrode 21 is formed approximately into a square, and its size is about 275 μm×275 μm. An adjacent reflecting electrode 21 is separated from the other one by 25 μm, and its numerical aperture is approximately 84%.

Each of the plurality of portions of reflecting electrode 21 is connected with an active element 46 via a conductor in a through-hole 41. Between the reflecting electrode 21 and active element 46, there are provided a second insulation layer 43 made of $SiN_x$ and a first irregularity formed layer 45, for insulating therebetween. The first irregularity formed layer 45 is provided in order to form the reflecting electrode 21 that has irregular surfaces. By provision of irregular surfaces on the reflecting electrode 21, the light that has passed through liquid crystal 10 is reflected as scattered light, which provides an advantage in that the background of the user is prevented from being reflected by the reflecting electrode 21 toward the user, and also the whole area of liquid crystal layer 10 is illuminated.

The first irregularity formed layer 45 is made of a positive or negative type photosensitive polymer. A plurality of island-like portions of the first irregularity formed layer 45 are disposed between the second insulation layer and the reflecting electrode. A method used for forming the first irregularity formed layer 45 to have such a shape, is comprised of the steps of: coating a film of photo sensitive resin thereon, forming the same into a column-like shape by photo lithography, then deforming its shape by heating, and forming an island-like portion having a mild slope as indicated in FIG. 1. Because reflecting electrode 21 is formed on this island-like portion, the surface of reflecting electrode 21 is formed to have irregularities having a mild slope, thereby providing a light scattering capability.

As a second orientation film 16, similar to the first orientation film 15, an organic polymer of polyimide made by Nissan Kagaku K.K. was used. Orientation processing by means of rubbing is applied both to the first and the second orientation films 15 and 16. A difference in the directions of orientation between the first orientation film 15 and the second orientation film 16 is given to have an angle of 240 degrees.

These two substrates 11 and 12 are opposed to each other like their orientation films are opposed, and the liquid crystal layer 10 is interposed and retained therebetween. Circumferences of substrates 11 and 12 are sealed by seal portion 81. Further, in order to secure a gap between the two substrates 11 and 12, and maintain a uniform thickness of the liquid crystal layer, a spacer (not shown) is interposed between the substrates 11 and 12. The spacer is made of spherical polymer beads, the diameter of which is 7 μm, and they are dispersed over the whole area of the display portion. The density of dispersion was set approximately at 100 beads/cm². Seal portion 81 was provided by coating a mixture of epoxy resin and spherical polymer beads around the periphery of the display unit.

Further, as liquid crystal layer 10, there was used a mixture of dichromatic pigments of an anthraquinone group and a diazo group, chiral material S811 made by Merck K.K., and a liquid crystal compound MLZ4792 made by Merck K.K. The weight ratio of S811 was about 0.9%. The dielectric constant anisotropy of MLZ4792 is positive, thus, it is a high resistant liquid crystal compound capable of active drive.

Although not indicated in FIG. 1, a drive circuit is connected to each of the flat light source 31 and the reflecting electrode 21. Further, a metal reinforcement frame is provided in the periphery of substrates 11 and 12. The thickness of the liquid crystal display unit in this condition was 1 mm. Viewed from the normal line direction of substrate 11 of the liquid crystal display unit, a relative position of the first light source electrode 22 to the reflecting electrode 21 is shown in FIG. 3. Namely, the first light source electrode 22 is distributed in a matrix arrangement over the reflecting electrode 21 so as to overlap a gap between respective portions of reflecting electrode 21. Thereby, in spite of the fact that the first light source electrode 22 that does not transmit light is disposed nearer to the first substrate 11 than the liquid crystal layer 10, a high numerical aperture can be obtained. In the liquid crystal display unit according to this embodiment of the invention, its numerical aperture is 78% in this condition.

Further, the reflection prevention layer 35 and the first light source electrode 22 function also as a black matrix and contribute to an increase in the contrast ratio by concealing a portion of its area without the presence of reflecting electrode 22 that does not contribute to its display.

Figure 4:
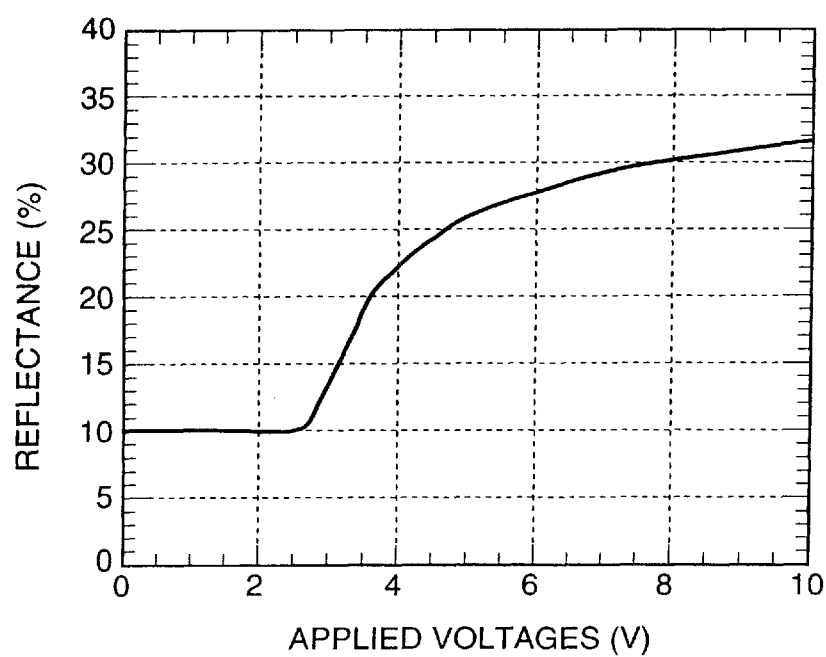
FIG. 4 is a graph depicting a relationship between reflectance and voltages applied to reflecting electrode 21 in the liquid crystal display apparatus of the invention.

This liquid crystal display apparatus is illuminated with white light from the outside, and by varying the voltage to be applied to the reflecting electrode 21 in a gate-open state, the dependency of the reflectance on the voltages applied is measured. A result of measurements is indicated in FIG. 4. A normally-close type voltage dependency is obtained, and the threshold voltage at which its reflectance starts to increase is approximately 2.7 V. The reflectance at 1 V of an effective value of voltage applied is 10%, and the reflectance at 10 V is 32%. By driving between these two voltages, a contrast ratio of 2:1 was obtained.

Then, when an ac field of 100 V effective at 60 Hz is applied across the first and the second light source electrodes 22, 23 in the flat light source 31, the flat light source 31 is enabled to emit light, such that the whole portion of the display area of the liquid crystal display unit is illuminated in a yellowish orange color, and even in a dark room, its display can be read. Further, its contrast ratio then was 3.0:1, which was approximately the same value as that measured when it was illuminated with white light from the outside. Brightness at a bright display was 21 cd/m². The reason why such a high brightness was obtained is because the flat light source 31 is arranged to emit its light only in a gap portion of the pixels, and, since the component of light which was emitted toward the substrate 11 is reflected by the first light source electrode 22, it is ensured that the light will not to be emitted directly to the user. Thereby, in the same manner as in the case of the external illumination, wherein its light reaches the user after passing through the liquid crystal layer 10 twice, almost all of its light of emission can be modulated in the liquid crystal layer 10.

As described above, by provision of the flat light source on the first substrate near to the liquid crystal layer 10, it is possible to read a display in a dark environment without the need for increasing the thickness of the liquid crystal display unit. Still further, when the flat light source 31 is turned on, approximately the same contrast ratio as obtained under the external light illumination is ensured.

Embodiment 2

A liquid crystal display apparatus according to a second embodiment of the invention will be described with reference to FIG. 5. The liquid crystal display apparatus of FIG. 5 differs from the liquid crystal display apparatus of FIG. 1 in the laminated structure of its flat light source 31 and in the materials of the light emitting layer 131.

Figure 5:
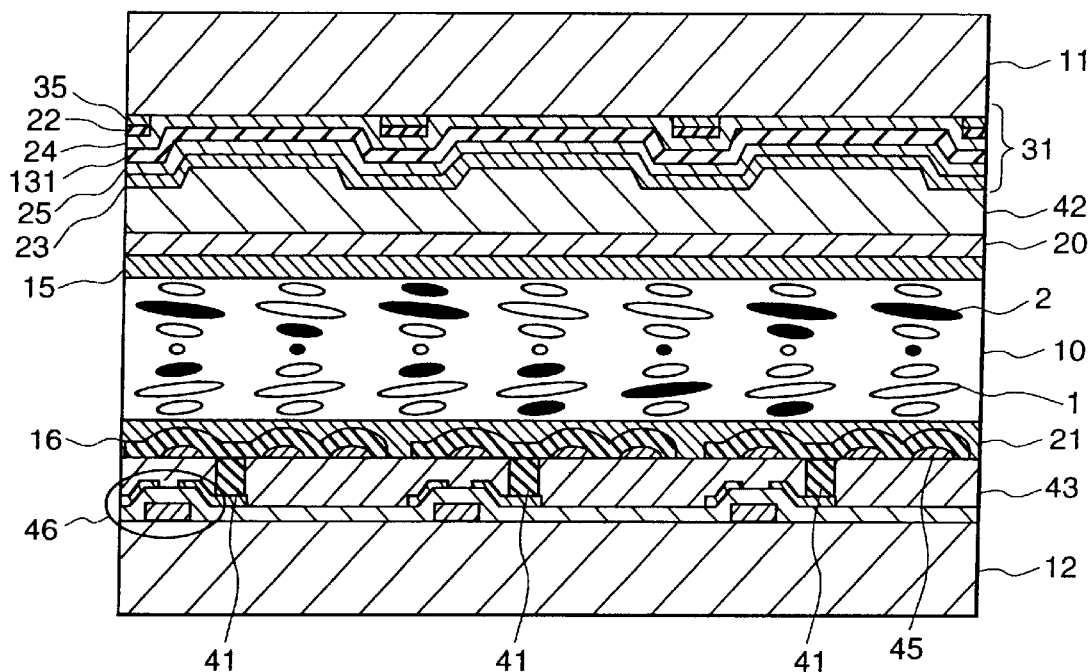
FIG. 5 is a schematic cross section of a liquid crystal display apparatus according to a second embodiment of the invention.

In the construction of the liquid crystal display unit of FIG. 5, the thickness of the light emitting layer 131 is reduced, and the light emitting layer 131 is interposed between a first dielectric layer 24 and a second dielectric layer 25. The thickness of light emitting layer 131 was set at 1 μm, and the thickness of each of the first and the second dielectric layers 24, 25 was set at 0.5 μm. ZnS with addition of Mn was used as a material of the light emitting layer 131, which was formed by vapor deposition of Mn and ZnS at the same time. Other portions and constructions are the same as in the liquid crystal display apparatus of the first embodiment of the invention, thereby, their description will be omitted.

By use of this vapor deposition method for forming light emitting layer 131, as described above, the thickness of the light emitting layer 131 can be reduced substantially. Further, both the first dielectric layer 24 and the second dielectric layer 25 function to prevent the first light source electrode 22 or the second light source electrode 22 from being damaged by hot carriers or the like that occur in the light emitting layer 131.

While illuminating this liquid crystal display unit by white light from the outside, the dependency of its reflectance on the voltages applied was measured. Then, a contrast ratio of 3.0:1 was obtained, which was similar to that of the first embodiment of the invention.

Further, when an ac electric field of 200 V effective at 1 kHz was applied to the flat light source 31, the whole portion of the display area in the liquid crystal display unit was illuminated in yellowish orange color, and even in a dark room, its display could be read. Brightness at a bright display was 22 cd/m$^2$. Its contrast ratio then was 3.5:1, which was approximately the same value as that measured in the light reflection state.

As described above, by forming the light emitting layer 131 by vapor deposition, the thickness of its layer can be reduced substantially. Also, in the case of the liquid crystal display unit of FIG. 5, in the same manner as in the case of the first embodiment, by provision of the flat light source on the first substrate near the liquid crystal layer 10, it is possible to read the display in a dark environment without need to increase the thickness of the liquid crystal display apparatus. In addition, when the flat light source 31 is turned on, approximately the same contrast ratio as under external light illumination can be obtained.

Embodiment 3

A liquid crystal display apparatus according to a third embodiment of the invention will be described.

The structure in cross-section of a liquid crystal display apparatus according to the third embodiment of the invention is similar to the structure of the second embodiment of the invention as shown in FIG. 5, however, it differs in the flat patterns of the first light source electrode 22 and reflecting electrode 35.

Figure 6:
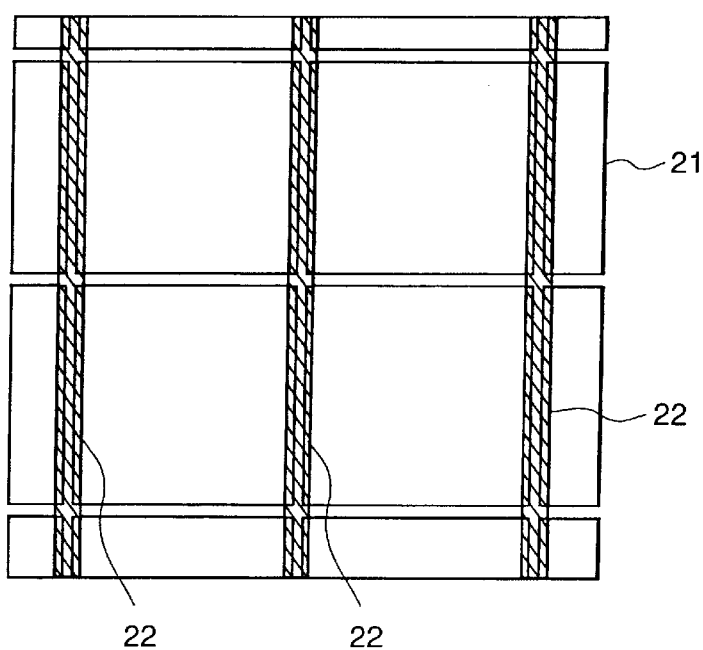
FIG. 6 is a diagram depicting patterns and positions of a first electrode 22 for a light source and a reflecting electrode 21 according to a third embodiment of the invention, as observed from the normal direction of substrate 11.

FIG. 6 shows the patterns of the first light source electrode 22 and the reflecting electrode 21 of the third embodiment of the invention as observed from a normal line direction of substrate 11. The first light source electrode 22 has a stripe-like pattern and is disposed so as to overlap a gap portion of the reflecting electrode 21. Further, each stripe-like portion of the first light source electrode 22 is connected another one in the outside of the display area. Reflection prevention layer 35 has the same pattern as that of the first light source electrode 22 and is disposed to overlap the first light source electrode 22. As described above, because the first light source electrode 22 and the reflection prevention layer 35 in the liquid crystal display apparatus according to this embodiment are formed into a stripe-like pattern, a high numerical aperture was obtained. The numerical aperture was 82% in the case of FIG. 6. In this case also, the reflection prevention layer 35 and the first light source electrode 22 function as a black matrix.

While subjecting this liquid crystal display unit to white light illumination, its dependency of reflectance on the voltages applied was measured, and a contrast ratio of 2.5:1 was obtained. Further, when its display area was illuminated by applying an ac electric field of 200 V effective at 1 kHz to the flat light source 31, and the dependency of reflectance on the voltages applied was measured in a dark room, a contrast ratio of 3.0:1 was obtained, which was approximately the same value as that obtained under the white light illumination state.

As described above, also in this case, wherein the flat patterns of the reflection prevention layer 35 and the first light source electrode 22 are formed into a stripe-like pattern, there is provided a liquid crystal display apparatus, which enables reading of the display in a dark environment without the need for increasing the thickness of the liquid crystal display apparatus. Further, when the flat light source 31 is turned on, approximately the same contrast ratio as that obtained under external light illumination is obtained.

Embodiment 4

A liquid crystal display apparatus according to a fourth embodiment of the invention will be described.

The structure in cross-section of the liquid crystal display apparatus according to this embodiment is similar to that of the second embodiment shown in FIG. 5, however, it differs from the second embodiment in the flat patterns of the first light source electrode 22 and the reflection prevention layer 35 in the flat light source 31.

Figure 7:
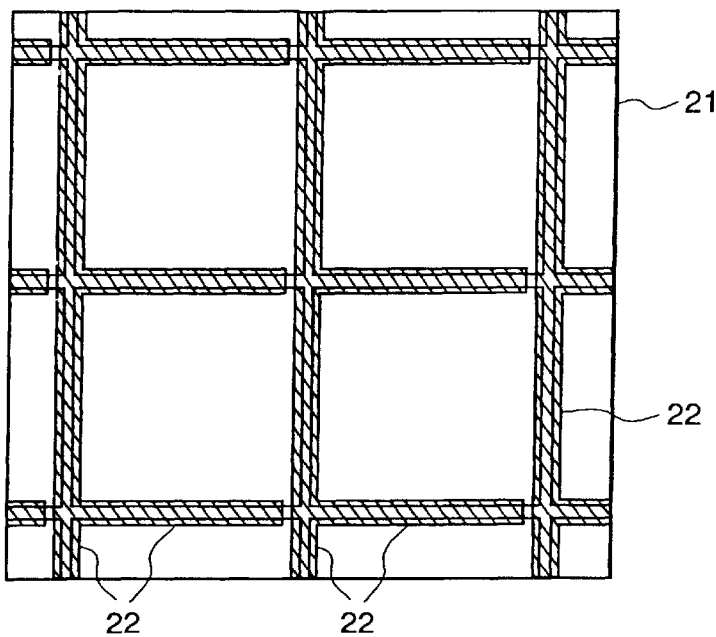
FIG. 7 is a diagram depicting patterns and positions of a first electrode 22 for a light source and a reflecting electrode 21 according to a fourth embodiment of the invention, as observed from the normal direction of substrate 11.

FIG. 7 shows the patterns of a first light source electrode 22 and a reflecting electrode 21 according to the fourth embodiment of the invention as observed from a normal line direction of substrate 11. The first light source electrode 22 has a comb teeth-like pattern and is disposed at a position that overlaps a gap portion of the reflecting electrode 21. Further, each portion of the first light source electrode 22 of the comb teeth-like pattern is connected to each other portion outside its display area. Reflection prevention layer 35 that has the same pattern as the first light source electrode 22 is disposed to overlap the first light source electrode 22. In the liquid crystal display apparatus of this embodiment, because the first light source electrode 22 and the reflection prevention layer 35 are formed into comb teeth-like patterns as described above, notwithstanding the fact that the reflection prevention layer 35 and the first light source electrode 22 are disposed on the first substrate 11, a high numerical aperture was obtained. Its numerical aperture in this condition was 78%. Further, the reflection prevention layer 35 and the first light source electrode 22 also have the function of a black matrix.

When this liquid crystal display unit was subjected to white light illumination, and the dependency of its reflection on the voltages applied was measured, a contrast ratio of 2.9:1 was obtained. Further, by applying an ac electric field of 200 V effective at 1 kHz to flat light source 31 and thereby illuminating its display area, its contrast ratio was measured to be 3.3:1 in a dark room, which is approximately the same as that obtained under white light illumination.

As described above, also in this case in which the flat patterns of the reflection prevention layer 35 and the first light source electrode 22 are formed into the comb teeth-like shape, a liquid crystal display apparatus that produces a display capable of being read in a dark environment without need to increase the thickness of the liquid crystal display unit is provided. Also, during operation with the flat light source 31 turned on, approximately the same contrast ratio as obtained under the external white light illumination is obtained.

Embodiment 5

A liquid crystal display apparatus according to a fifth embodiment of the invention will be described.

The structure in cross-section of a liquid crystal display apparatus according to the fifth embodiment of the invention is similar to that of the second embodiment of the invention except that it differs therefrom in the flat surface patterns of a first light source electrode 22 and a reflection prevention layer 35 provided in the flat light source 31.

Figure 8:
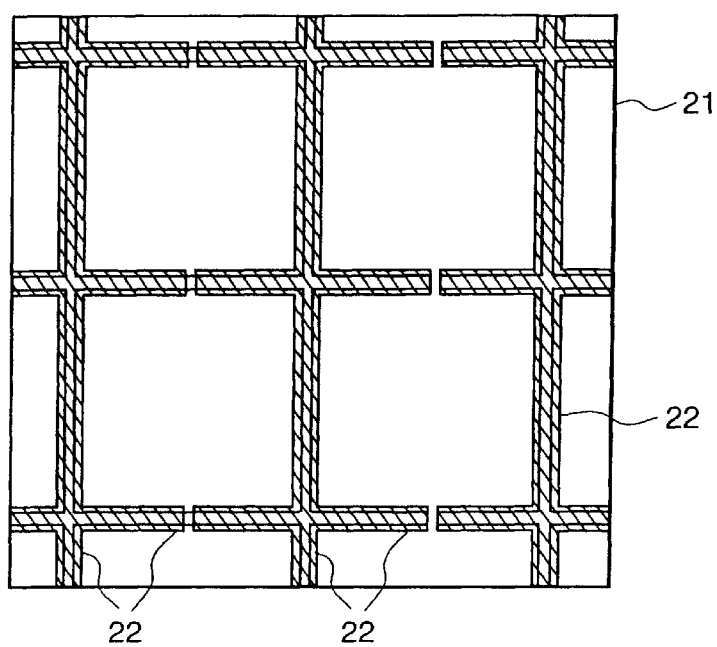
FIG. 8 is a diagram depicting patterns and positions of a first electrode 22 for a light source and a reflecting electrode 21 according to a fifth embodiment of the invention, as observed from the normal direction of substrate 11.

In the liquid crystal display apparatus of this embodiment, flat patterns of first light source electrode 22 and reflection prevention layer 35 are modified into another type of comb-teeth arrangement having two comb-teeth edges arranged on both sides thereof. FIG. 8 shows the patterns of the first light source electrode 22 and reflecting electrode 21 as observed from a normal line direction of substrate 11. The first light source electrode 22 that has a pair of comb-teeth arranged on both sides thereof so as to overlap a gap portion of the reflecting electrode 21. Further, each portion of the first light source electrode 22, which is provided in the comb teeth-like pattern is connected to each other portion outside its display area. The reflection prevention layer 35 that has the same pattern as the first light source electrode 22 is disposed to overlap the first light source electrode 22. Because of provision of this arrangement of patterns in the liquid crystal display unit according to this embodiment of the invention, notwithstanding the fact that the reflection prevention layer 35 and the first light source electrode 22 were formed on the first substrate 11, a high numerical aperture was obtained. The numerical aperture in this case was 78%. Further, reflection prevention layer 35 and the first electrode 22 also have the function of a black matrix.

When the dependency of reflectance on the voltages applied was measured while irradiating white light on the liquid crystal display apparatus of this embodiment, a contrast ratio of 2.9:1 was obtained. Further, when contrast ratios were measured in a dark room while illuminating its display portion by applying a.c. electric field of 200 V effective at 1 kHz to flat light source 31, a contrast ratio of 3.3:1 was obtained, which is approximately the same value as obtained under white light illumination.

Even in the above case in which the flat patterns of the reflection prevention layer 35 and the first light source electrode 22 were formed to have the comb teeth-like shape with a pair of them arranged on both sides thereof, a liquid crystal display which is capable of being read under a dark environment without need to increase the thickness of the liquid crystal display apparatus has been provided. Further, during operation when the flat light source 31 is turned on, approximately the same contrast ratio as obtained during external light illumination was obtained.

Embodiment 6

Another liquid crystal display apparatus according to a sixth embodiment of the invention will be described.

Figure 9:
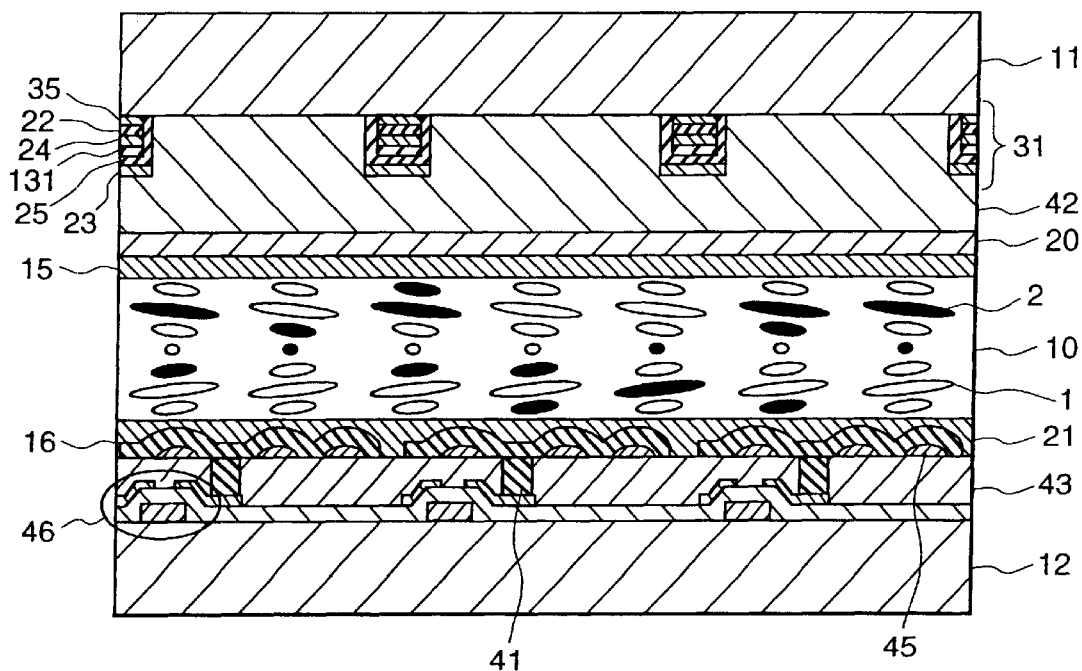
FIG. 9 is a schematic cross section of a liquid crystal display apparatus according to sixth embodiment of the invention.

The liquid crystal display apparatus according to the sixth embodiment of the invention has a laminated structure similar to that of the liquid crystal display apparatus of the second embodiment of the invention, except that the flat patterns of a first dielectric layer 24, a light emitting layer 131, a second dielectric layer 25, and a second light source electrode 23 in the flat light source 31 are formed into a matrix arrangement similar to the flat pattern of the first light source electrode 22, as indicated in FIG. 9. That is, the first dielectric layer 24, light emitting layer 131, and the second light source electrode 23 are disposed only in a portion that overlaps the first light source electrode 22. Further, the second dielectric layer 25 that is disposed in a portion that overlaps the first light source electrode 22 also covers a cross-section of the light emitting layer 131. This arrangement of the second dielectric layer 24 as described above can prevent electrons having a high kinetic energy that have been generated in the light emitting layer 131 from reaching other layers passing through the cross-section of the light emitting layer 131, and also can reduce damage on the light emitting layer 131 in the process of manufacture thereof.

When the dependency of the reflectance on the voltages applied is measured while illuminating this liquid crystal display apparatus with white light, a contrast ratio of 3.6:1 was obtained. Further, when contrast ratios were measured in a dark room while illuminating the display area by applying an a.c. electric field of 200 V effective at 1 kHz to the flat light source 31, a contrast ratio of 3.7:1 was obtained, which is approximately the same value as obtained under white light illumination.

Further, these contrast ratios are higher than the contrast ratios of the liquid crystal display units according to the first to the fifth embodiments. This is because, in the aperture portion of the first light source electrode 22, the first dielectric layer 24, the light emitting layer 131, the second dielectric layer 25 and the second light source electrode 23 no longer exist, thereby reducing the number of interfaces for the light transmitted through liquid crystal layer 10 to pass through before it reaches the user. Thereby, interfacial reflection is substantially reduced, and the contrast ratio is increased greatly in comparison with the liquid crystal display units according to the first to the fifth embodiments of the invention.

Embodiment 7

A liquid crystal display apparatus according to a seventh embodiment of the invention will be described.

The structure in cross-section of the liquid crystal display apparatus of the seventh embodiment of the invention is similar to that of the second embodiment of the invention indicated in FIG. 5, except that the material of the first insulating layer 42 is changed to another material that scatters light, and without provision of the first irregularity formed layer 45, the reflecting electrode 21 is directly disposed on the second insulating layer 43. Therefore, the reflecting electrode 21 was formed to have a flat surface without irregularities. As a specific material of the first insulating layer 42, an acrylic organic polymer in which silicon fine particles are scattered was used. The silicon fine particles were approximately spherical and had a diameter of 3 $\mu$m to 10 $\mu$m.

Because the material of the first insulating layer 42 was changed to an acrylic organic polymer with silicon fine particles so as to give a light scattering property to the first insulating layer 42, even if the reflecting electrode 21 is made flat, a preferred light scattering property can be obtained; and thus, a desirable display characteristic similar to that of the liquid crystal display unit of the second embodiment of the invention was obtained. In addition, because there is no need for providing the first irregularity formed layer 45 any more in the process of manufacture, the process of manufacture can be simplified substantially.

Further, when the dependency of reflectance on the voltages applied was measured of the liquid crystal display unit of this embodiment while illuminating the same with white light, a contrast ratio of 3.0:1 was obtained. Further, when contrast ratios were measured in a dark room while illuminating the display portion by applying an a.c. electric field to the flat light source 31 at 1 kHz, 200 V effective, a contrast ratio of 3.4:1 was obtained, which is approximately the same value as obtained under white light illumination.

As described above, by provision of the light scattering property in the first insulating layer 42, a reflection type liquid crystal display apparatus featuring a simplified process of manufacture and an improved contrast ratio can be provided.

Embodiment 8

A liquid crystal display unit according to an eighth embodiment of the invention will be described.

The liquid crystal display unit of this embodiment has a structure similar to that of the liquid crystal display unit according to the second embodiment of the invention indicated in FIG. 5, however, it distinguishes in that a triangular layer 40 having oblique surfaces of a triangle cross-section is newly formed between the first substrate 11 and reflection prevention layer 35, and on one of its oblique surfaces, the reflection prevention layer 35 and first light source electrode 22 are disposed. oblique layer 40 is made of $SiN_x$. In this oblique layer 40, the cross-section of which is an equilateral triangle, the width of its bottom side is 80 $\mu$m, and the height is 10 $\mu$m. As a method of forming this oblique layer 40, steps of forming a $SiN_x$ film on substrate 11 and etching this film using an etching solution having a low selectivity ratio can be used.

Figure 10:
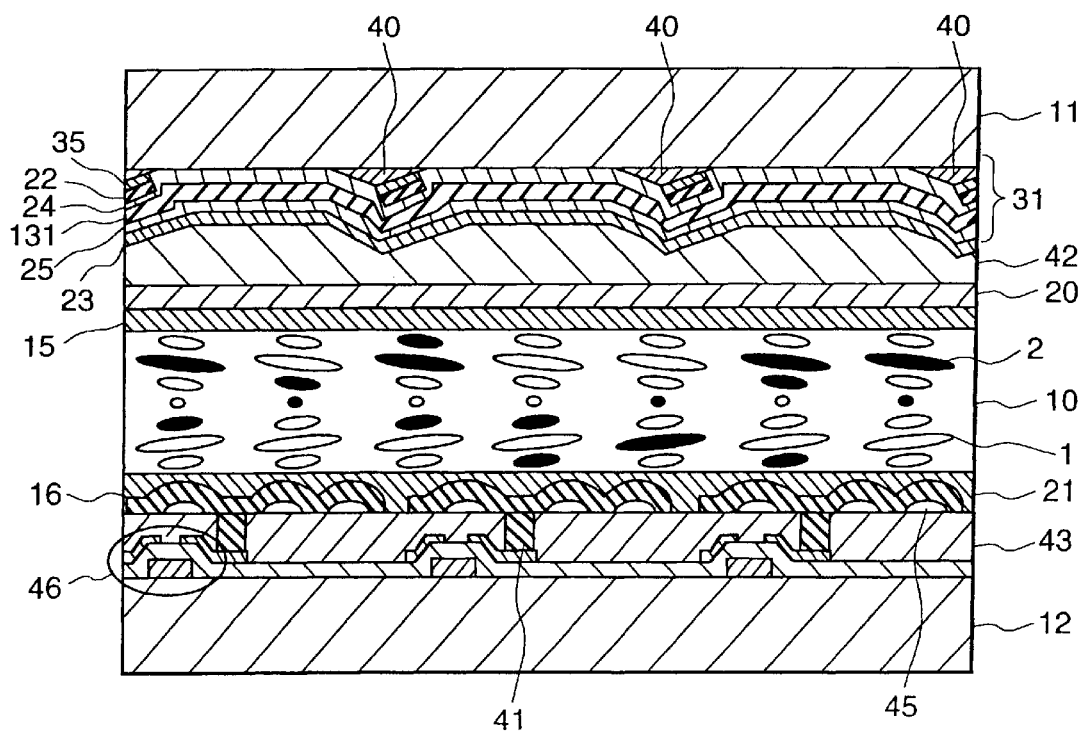
FIG. 10 is a schematic cross section of a liquid crystal display apparatus according to an eighth embodiment of the invention.

In the liquid crystal display unit depicted in FIG. 10, by provision of the reflection prevention layer 35 and the first light source electrode 22 formed on one of the oblique surfaces of oblique layer 40, the flat light source 31 is allowed to emit its light in a direction that is slanted relative to a normal line direction of substrate 11. Thereby, it is ensured that as much light as possible emitted from flat light source 31 will reach the reflecting electrode 21, thereby improving the brightness of display.

More specifically, in the display operation while applying an a.c. field to the flat light source 31 at 1 kHz, 200 V effective, a brightness of display under an illumination of 27 cd/m$^2$ was obtained. This brightness improvement is greater than that of the liquid crystal display unit of the second embodiment of the invention.

Embodiment 9

Figure 11:
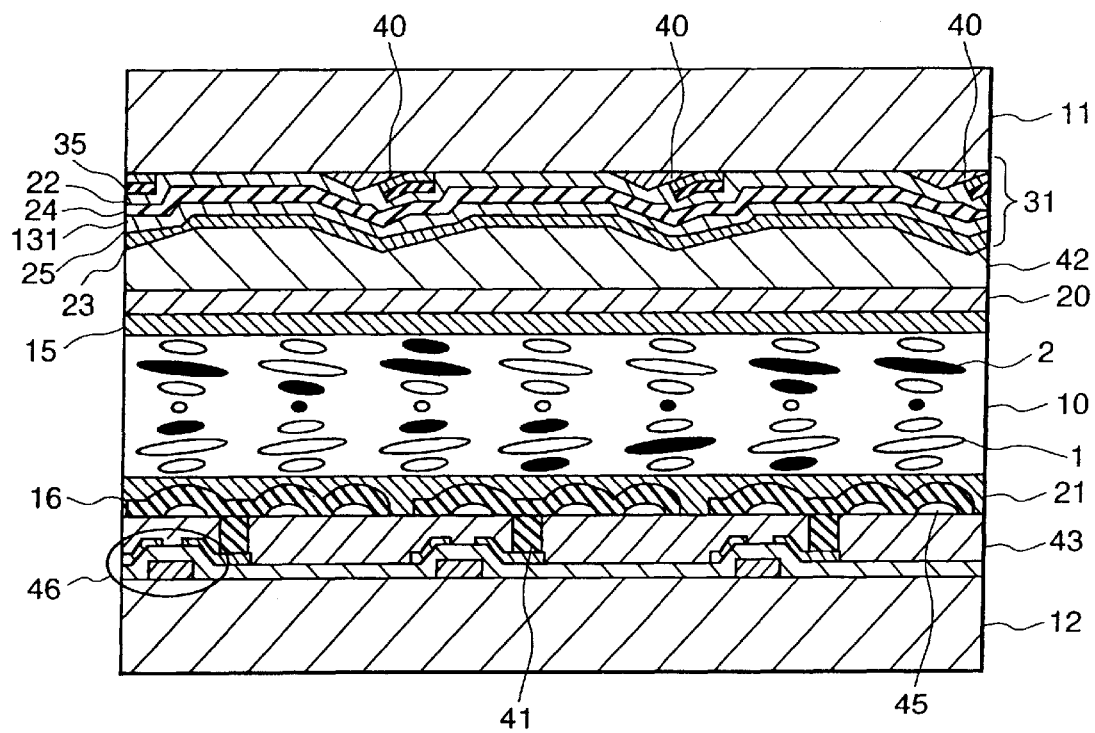
FIG. 11 is a schematic cross section of a liquid crystal display apparatus according to a ninth embodiment of the invention.

With reference to FIG. 11, a liquid crystal display apparatus according to ninth embodiment of the invention will be described.

The liquid crystal display apparatus of this embodiment has a structure similar to that of the liquid crystal display apparatus of the eighth embodiment, however, it differs from the eighth embodiment in that the size of the oblique layer 40 is smaller than that of FIG. 10, and the reflection prevention layer 35 and the first light source electrode 22 are disposed on one of the oblique surfaces of oblique layer 40, while spanning over a portion of substrate 11 where the oblique layer 40 does not exist. More specifically, the bottom side and the height thereof are set at 40 $\mu$m and 6 $\mu$m, respectively.

Also, in this structure, because it is ensured that the flat light source 31 will emit its light in a direction that is slanted relative to a normal line direction of substrate 11, most of the light emitted from the flat light source 31 is certain to reach the reflecting electrode 21, thereby substantially improving the brightness of the display.

More specifically, in the display operation, while applying an a.c. field to the flat light source 31 at 1 kHZ, 200 V effective, a brightness of 25 cd/m$^2$ under illumination was obtained. This brightness improvement exceeds that of the liquid crystal display apparatus of the second embodiment of the invention.

Embodiment 10

A liquid crystal display apparatus according to a tenth embodiment of the invention will be described with reference to FIG. 12.

The liquid crystal display apparatus of the tenth embodiment has a structure similar to that of the liquid crystal display apparatus of the eighth embodiment of the invention indicated in FIG. 10, however, it differs from the eighth embodiment in that the cross-sectional shape of the oblique layer 40 is formed as a trapezoid, and its reflection prevention layer 35 and first light source electrode 22 are mounted only on one of the oblique surfaces of the oblique layer 40. Here, the width of the bottom side of the trapezoidal oblique layer 40 was set at 100 $\mu$m, the width of the upper side thereof was set at 20 $\mu$m, and the height thereof was set at 10 $\mu$m.

Thereby, because the flat light source 31 is allowed to emit its light in a direction slanted relative to a normal line direction of substrate 11, it is ensured that most of the light emitted from the flat light source 31 will reach the reflecting electrode 21, thereby substantially improving the brightness of the display. When the display operation is executed while applying an a.c. electric field to the flat light source 31 at 1 kHz, 200 V effective, a brightness of 27 cd/cm$^2$ under illumination was obtained. This brightness improvement exceeds that obtained in the liquid crystal display unit of the second embodiment.

In the above embodiments 8–10, oblique layer 40 was described by way of example as a triangle or a trapezoid, but it is not limited to such shapes; rather, the shape of the oblique surface of the oblique layer 40 may be changed variously so long as the main direction of light emission from the flat light surface can be slanted relative to the normal line direction of the substrate, whereby the same effect as above can be obtained to improve the brightness of the display.

Eleventh Embodiment

A liquid crystal display apparatus according to an eleventh embodiment of the invention will be described.

Figure 13:
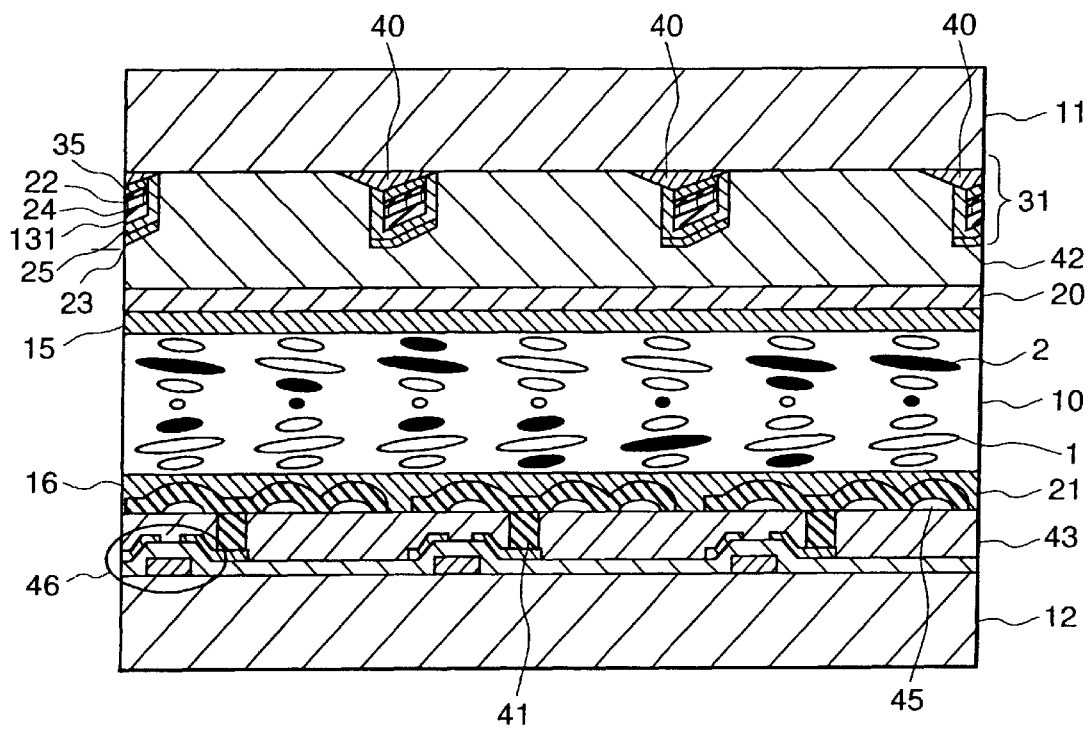
FIG. 13 is a schematic cross section of a liquid crystal display apparatus according to an eleventh embodiment of the invention.

With reference to FIG. 13, the liquid crystal display apparatus of this embodiment has a structure approximately similar to that of the liquid crystal display apparatus of the eighth embodiment of the invention indicated in FIG. 10, however, it differs from the eighth embodiment in that flat patterns of its first dielectric layer 24, light emitting layer 131 and second light source electrode 23 are formed to have a matrix pattern similar to the flat pattern of the first light source electrode 22. Namely, the first dielectric layer 24, light emitting layer 131 and the second light source electrode 23 are provided only in a portion below the first light source electrode 22. Further, the second dielectric layer 24 that is disposed in a portion that overlaps the first light source electrode 22 is also disposed so as to cover a cross section of the light emitting layer 131.

Further, as a method of manufacturing the flat light source 31 having the above pattern, there can be used steps that include, after forming the first light source electrode 22, covering a portion where the first light source electrode 22 is not present with a mask, then forming first dielectric layer 24 and second dielectric layer 25 by spin-coating selectively only in the portion where the first light source electrode 22 is present. In the same way, light emitting layer 131 can be selectively formed only in the portion where the first light source electrode 22 is present by vapor deposition, which is conducted after covering the portion where the first light source electrode 22 is not present with a mask. However, when forming the second dielectric layer 25, a mask that has a broader aperture than that used in forming the first light source electrode 22 is used.

When the dependency of the reflectance on the voltages applied was measured while subjecting the liquid crystal display unit according to this embodiment of invention to the white light illumination, a contrast ratio of 3.6:1 was obtained. Further, when the contrast ratio was measured in a dark room while applying an a.c. electric field to flat light source 31 at 1 kHz, 200 V effective, to illuminate its display portion, a ratio of 3.7:1 was obtained, which was approximately the same value as obtained under white light illumination. Further, the brightness of the display at this time under illumination was 27 cd/m$^2$.

The reason why such a high contrast ratio was obtained in comparison with that of the second embodiment of the invention is because, like the liquid crystal display unit of the sixth embodiment indicated in FIG. 9, the first dielectric layer 24, the light emitting layer 131, the second dielectric layer 25 and the second light source electrode 23 no longer exist in the aperture portion of the first light source electrode 22; therefore, the number of layers present in the aperture portion is reduced, and thus, the interfacial reflection in the aperture portion is minimized. In addition, a synergistic effect of slanting the main direction of the light emitted from the flat light source 31 relative to the normal line direction of the substrate is added, thereby obtaining improved brightness of the display under illumination in comparison with the liquid crystal display of the second embodiment.

Embodiment 12

Figure 14:
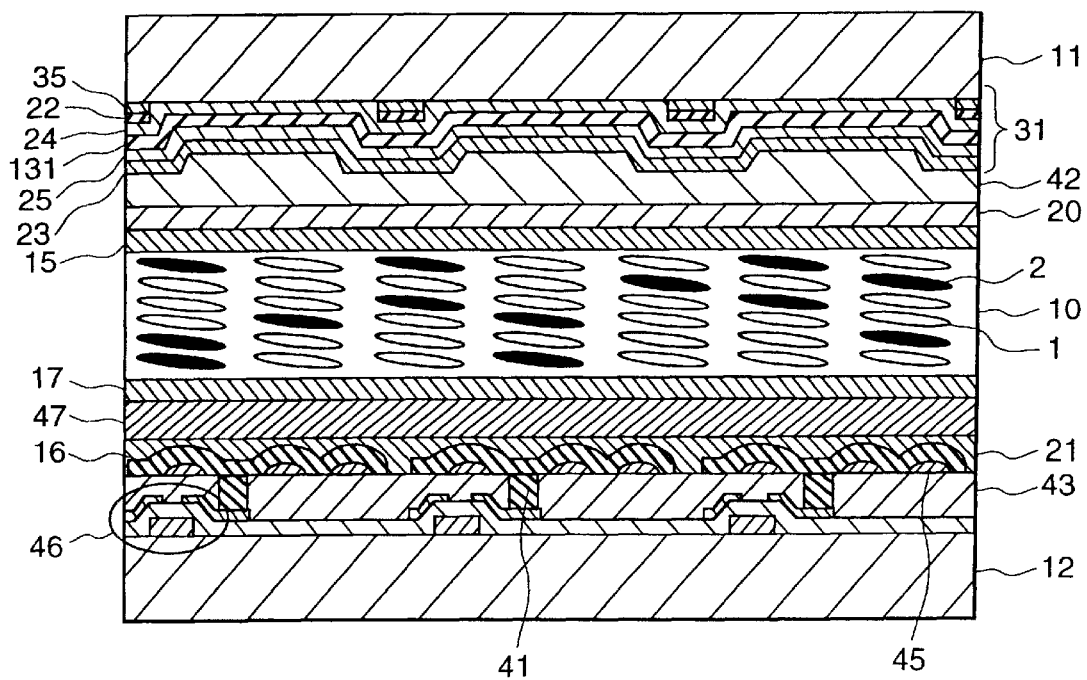
FIG. 14 is a schematic cross section of a liquid crystal display apparatus according to a twelfth embodiment of the invention.

With reference to FIG. 14, a liquid crystal display apparatus according to a twelfth embodiment of the invention will be described.

The liquid crystal display apparatus of this embodiment has a structure similar to that of the liquid crystal display apparatus of the second embodiment indicated in FIG. 5, except that the former has a phase plate 47 and a third orientation film 17 interposed between the second orientation film 16 and liquid crystal layer 10.

Figure 18:
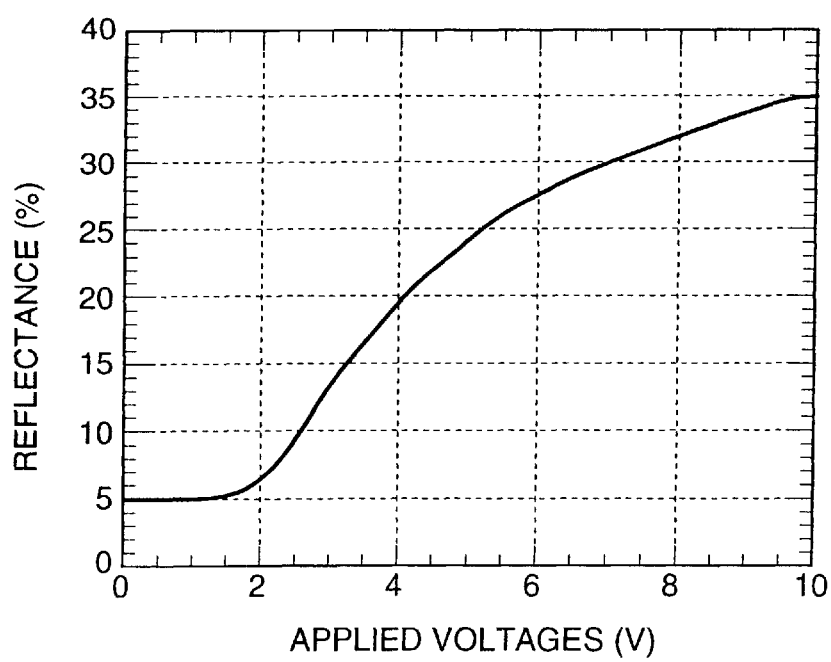
FIG. 18 is a graph indicating a relationship between the reflectance and the voltage applied to reflecting electrode 21 in the liquid crystal display apparatus according to the twelfth embodiment of the invention.

In the liquid crystal display apparatus of FIG. 14, the first orientation film 15 and the third orientation film 17 are arranged to become anti-parallel to each other in terms of their orientation directions, while the second orientation film 16 and the third orientation film 17 are arranged to have an angle of 45 degrees between their directions of orientation. Retardation of phase plate 47 is a quarter wavelength. Further, the liquid crystal material that constitutes liquid crystal layer 10 does not contain chiral material. Thereby, it becomes possible for the liquid crystal layer 10 to have a homogeneous orientation, and provide 45 degrees of angle between the directions of orientation of the liquid crystal layer 10 and the phase plate. The dependency of its reflectance on the voltages applied was measured for the liquid crystal display apparatus of FIG. 14 under white light illumination while varying the voltage applied to the reflecting electrode 21 in a gate-open state. As a result, the normally-close type of reflectance dependency on the voltage applied was obtained, as indicated in FIG. 18. Reflectance under application of effective voltages of 1 V and 10 V was 5% and 35%, respectively, and a contrast ratio of 7.0:1 was obtained when driven between these two voltages.

Further, when an a.c. electric field of 1 kHz, effective voltage of 200 V, was applied to the flat light source 31, the whole display portion of the liquid crystal display apparatus was illuminated in a yellowish orange color, and its display could be read even in a dark room. Brightness of illuminated display was 22 cd/m$^2$. Further, the contrast ratio at that time was 6.5:1, which was approximately the same value as obtained under white light illumination.

By provision of a homogeneous orientation to the liquid crystal layer 10, as well as an angle of 45 degrees between the directions of orientation for the liquid crystal layer and the phase plate, it has become possible to efficiently absorb both of the two types of eigenpolarization that propagate through the liquid crystal layer, thereby increasing the contrast ratio. Further, both contrast ratios with and without turning on the flat light source could be improved likewise.

Further, the phase plate 47 and the third orientation film 17 according to this embodiment of the invention can be formed in a method as follows. The steps of manufacture of the phase plate 47 and the orientation film 17 will be described with reference to FIG. 15 as steps (a) to (f).

Here, phase plate 47 is formed by polymerization of photochemical polymerizing liquid crystal molecules. Further, the third orientation film 17 is formed of a material having an optical orientation property.

In a first step (a), a second orientation film 16 is formed by spin coating, and an orientation process using rubbing is applied thereto in step (b).

Figure 17:
FIG. 17 is a diagram which depicts a molecular structure of a photo-polymerizing liquid crystal molecule used for producing phase plate 47 of the liquid crystal display apparatus according to the twelfth embodiment of the invention.

Then, in order to form phase plate 47, a liquid crystal molecular layer having an optical polymerization property is formed on the second orientation film 16. The photo polymerizing liquid crystal molecule used here was described in a paper by Dirk J. Broer, Rif at A. M. Hikment, Ger Challa (Marromol. Chem. Vol 190, 3201–3219 (1989)). Since the molecular structure of the photo polymerizing liquid crystal molecule has acrylic radicals on both sides of its string as shown in FIG. 17, it can polymerize into a polymeric form. Further, it can assume a liquid crystal state by means of mesogen parts in the center and a bar-like structure.

First, the photo polymerizing liquid crystal molecule dissolved in a solvent was spin-coated on the second orientation film 16 to form a layer 1501 in step (c). Then, after removing the solvent of layer 1501, the photo polymerizing liquid crystal molecule is heated to 160° C. to make the same once into an isotropic layer. Then, the temperature was decreased down to 140° C. to make a liquid crystal layer of the photo polymerizing liquid crystal molecule and to orient its direction of orientation in parallel with a direction of orientation of the second orientation film 16. Because the photo polymerizing liquid crystal layer is thin enough, an orientation regulating force of the second orientation film 16 exerts its influence over the whole area of the layer;

therefore, a formation of a homogeneous orientation in parallel with the direction regulated by the second orientation film 16 was obtained on the same layer. Then, by irradiation of light on this layer, the liquid crystal molecule was polymerized to form a phase plate 47 with its direction of orientation being maintained (step (d)). A high-pressure mercury lamp was used as a light source for irradiation of light that has a bright line at 360 nm wavelength. The intensity of irradiation was 5 J/cm$^2$, and the period of time of irradiation was 5 minutes. The value of birefringence after the polymerization, although it depends on polymerization conditions, was approximately 0.15 to 0.16. Here, the film thickness of the phase plate 47 was set approximately at 1 μm to set its retardation at a quarter wavelength.

Figure 16:
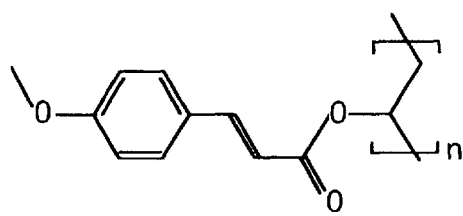
FIG. 16 is a diagram which depicts a molecular structure of optical orientation material used for producing the third orientation film of the liquid crystal display apparatus according to the twelfth embodiment of the invention.

After that, a third orientation film 17 is formed with material having an optical orientation property. Firstly, a layer 151 of the material having the optical orientation property was formed by spin coating (step (e)). Here, as a material having the optical orientation property, polyvinyl ester that has paramethoxyl cinamic acid as its side-chain is used. Its molecular structure is shown in FIG. 16. By light irradiation of this material, its paramethoxyl cinamic acid of the side chain undergoes a photo dimerization reaction. Further, a layer 1517 made of this material can choose a combination of two types of paramethoxyl cinamic acids that produce a photo reaction in accordance with the direction of oscillation of its electric vector, if a light of linear polarization is used as the light of irradiation. Therefore, it becomes possible to control the direction of its chemical bond resulting from the photo reaction. Since it is known from experience that the liquid crystal molecules are oriented perpendicular to a direction of oscillation of the linear polarization, it is possible to control the directions of orientation of the liquid crystal by the direction of oscillation of the irradiation light (linear polarization).

In the next step (f), orientation processing is applied to layer 1517 by irradiation of light thereon. As a light source for the orientation processing, a high-pressure mercury lamp was used, and the rays of the light source that represent natural light are linearly polarized. The intensity of the irradiation of light was 5 J/cm$^2$, and the period of time of irradiation was 2 minutes.

As for these optical orientation materials and optical orientation methods, they are described in detail, for example, in JP Publication No. 2608661, and in a paper of Martin Schadt, Hubert Seiberle, Andreas Schuster, et al. (NATURE, Vol 381, May 16, 1995). In addition to the optical orientation material shown in FIG. 16, for example, a chalcone group organic polymer may be used as well. Further, in addition to the photo polymerizing optical orientation film, other optical orientation materials that utilize a photo dissociation reaction or a photoisomerization reaction may also be used as well.

Embodiment 13

A liquid crystal display apparatus according to a thirteenth embodiment of the invention will be described.

Figure 12:
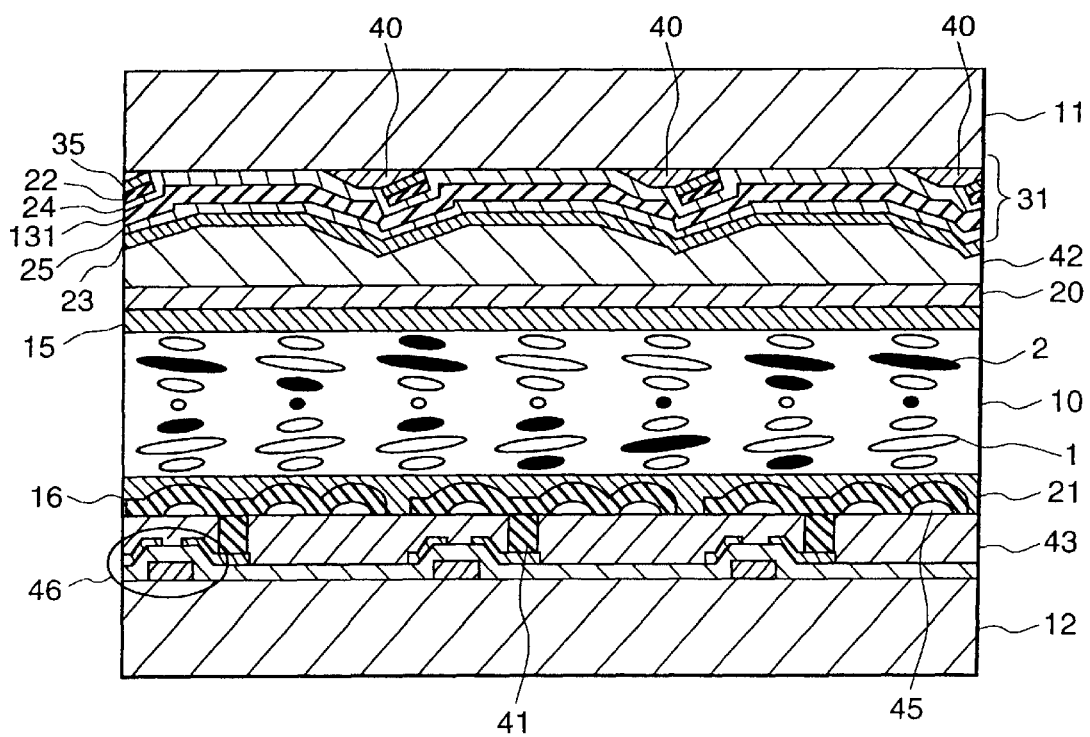
FIG. 12 is a schematic cross section of a liquid crystal display apparatus according to a tenth embodiment of the invention.

The liquid crystal display apparatus of this embodiment is similar to the liquid crystal display apparatus of the twelfth embodiment as shown in FIG. 12 except that the retardation of phase plate 47 and the directions of orientation of the first orientation film 15, the second orientation film 16 and the third orientation film 17 are varied. More specifically, by modifying the film thickness of the phase plate 47 to approximately 0.5 μm, its retardation was 75 nm. Further, the direction of orientation of the third orientation film 17 was set at an angle of 240 degrees anti-clockwise relative to that of the first orientation film 15, and the direction of orientation of the second orientation film 16 was set at an angle of 45 degrees anti-clockwise relative to the direction of orientation of the third orientation film 16. Still further, the liquid crystal material used for liquid crystal layer 10 contained 0.9% of chiral material as in the second embodiment.

Thereby, the liquid crystal layer is made to have a twisted orientation, its twist angle being 240 degrees, and the direction of its twist is anti-clockwise from the first substrate 11 toward the second substrate 12. Further, the direction of the orientation of phase plate 47 was set at 45 degrees relative to the direction of orientation of the liquid crystal layer 10 in proximity thereto.

Figure 19:
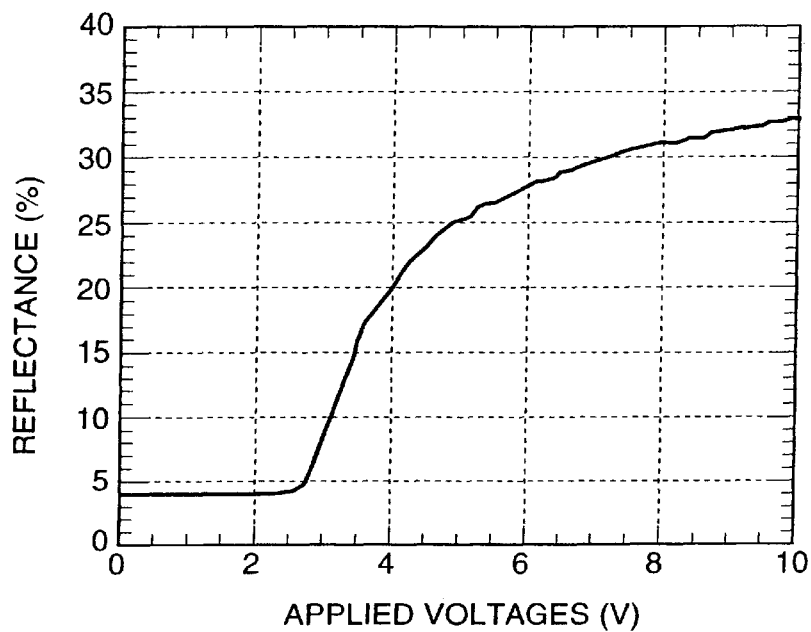
FIG. 19 is a graph indicating a relationship of the reflectance versus the voltage applied to the reflecting electrode 21 in the liquid crystal display apparatus according to a thirteenth embodiment of the invention.

While irradiating white light on this liquid crystal display unit, the dependency of the reflectance on the voltages applied was measured in a gate-open state thereof. A result of measurements is indicated in FIG. 19. A normally close type application voltage dependency was obtained. The reflectance at effective voltages of 1 V and 10 V was 4% and 33%, respectively. By driving between these voltages, a contrast ratio of 2:1 was obtained. Further, a display color when the effective applied voltage was 1 V was almost achromatic.

Still further, when an ac electric field was applied to the flat light source 31 at 1 kHz, with an effective voltage of 200 V, the whole display portion of the liquid crystal display was illuminated in a yellowish orange color, and its display could be read even in a dark room. The brightness of the display under illumination was 21 cd/m$^2$. The contrast ratio then was 7.1:1, which was almost the same value as obtained under white light illumination.

As described above, by provision of the twisted orientation to the liquid crystal layer 10, as well as the anticlockwise angle of 45 degrees for the direction of orientation of phase plate 47 relative to the direction of orientation of the liquid crystal layer 10 in proximity thereto, it became possible for both of the two types of eigenpolarization rays that propagate through the liquid crystal layer 10 to be effectively absorbed over the whole range of visible wavelengths, thereby substantially increasing the contrast ratio, and also causing the dark display color to become achromatic.

Embodiment 14

Figure 20:
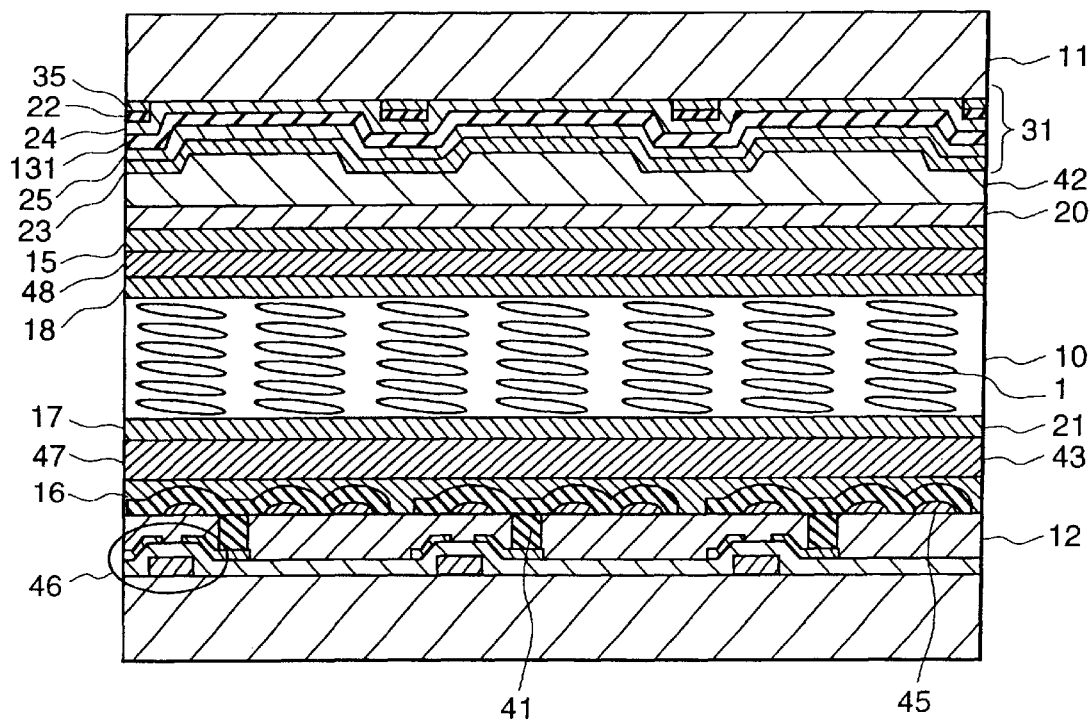
FIG. 20 is a schematic cross-sectional view of a cross-section of a liquid crystal display apparatus according ta a fourteenth embodiment of the invention.

A liquid crystal display apparatus according to a fourteenth embodiment of the invention will be described with reference to FIG. 20.

The liquid crystal display apparatus according to this embodiment of the invention has a similar structure to that of the second embodiment of the invention shown in FIG. 5, however, it distinguishes therefrom in that a phase plate 47 and a third orientation film 17 are disposed between the second orientation film 16 and the liquid crystal layer 10, and a polarization plate 48 and a fourth orientation film 18 are disposed between the first orientation film 15 and the liquid crystal layer 10.

Retardation of the phase plate was set to be a quarter wavelength similar to the thirteenth embodiment of the invention. Further, the directions of orientation between the third orientation film 17 and the fourth orientation film 18 are set to become anti-parallel to each other. Thereby, the orientation state of liquid crystal layer 10 becomes a homogeneous orientation. Further, the direction of orientation of the first orientation film 15 was set to 90 degrees relative to the direction of orientation of the third orientation film 17. The direction of orientation of the second orientation film 16 was set to 45 degrees relative to the direction of orientation of the fourth orientation film 18.

MLC-6252 of Merck was used for the liquid crystal layer, and spherical polymer beads with a diameter of 4 μm were used as spacers. For the seal portion, the same polymer beads were used. Thereby, the thickness of the liquid crystal layer was set approximately at 4 μm, and Δnd of the liquid crystal layer was set approximately at 32 μm.

The materials used for the phase plate 47 and the third orientation film 17 and their methods of manufacture were the same as those of the thirteenth embodiment of the invention.

Figure 15:
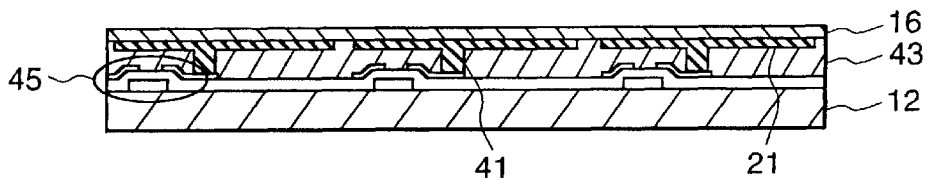
FIG. 15 is a process flow diagram indicating processes (a)–(f) of pattern forming of a phase plate 47 and a third orientation film 17 of a liquid crystal display apparatus according to a twelfth embodiment of the invention.
Figure 15:
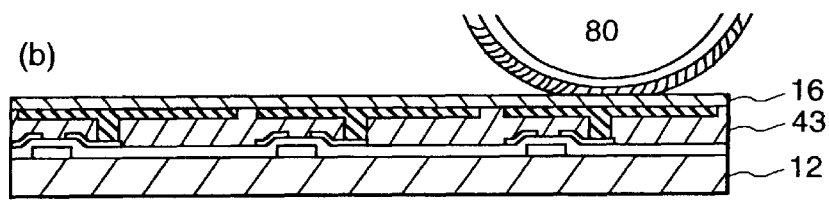
Figure 15:
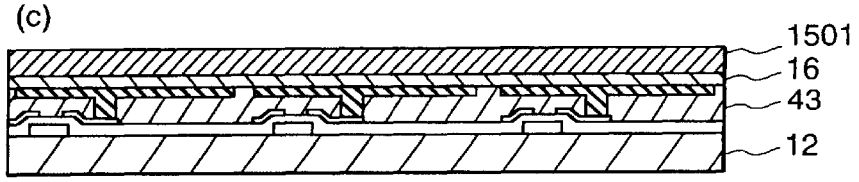
Figure 15:
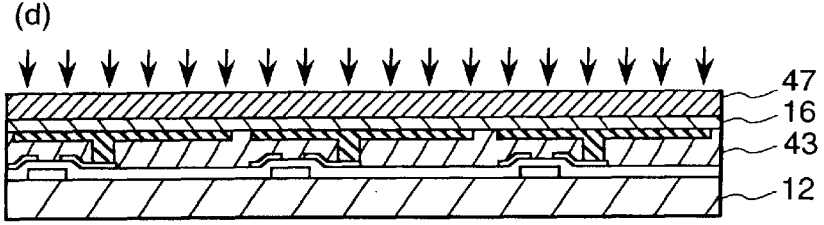
Figure 15:
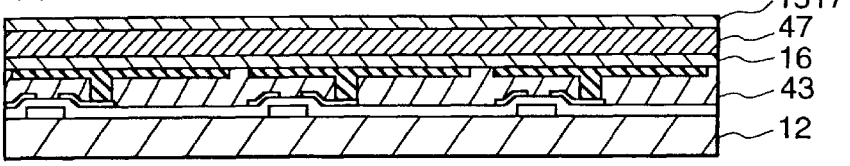
Figure 15:
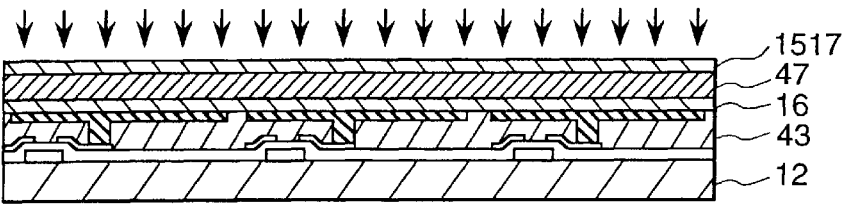

On the other hand, the process of manufacture of the polarization plate 48 is approximately the same as that of the phase plate 47 indicated in FIG. 15, however, it distinguishes therefrom in that, although the phase plate 47 uses photo polymerization molecules, the polarizer plate 48 uses a mixture of photo polymerization molecules and dichromatic pigment.

As a process of formation of the polarizer plate 48, at first, the first orientation film 15 is formed by spin coating, then it is subjected to orientation processing by a rubbing method using a rubbing roll 80. In the next step, photo polymerization liquid crystal molecules mixed with dichromatic pigment are formed on the first orientation film 15. A layer including the photo polymerization liquid crystal molecules and the dichromatic pigment is thin enough such that the orientation regulating force of the first orientation film 15 is exerted all over the layer, and the same layer forms a homogeneous orientation in parallel with the direction regulated by the first orientation film 15. At this time, the dichromatic pigment contained in the photo polymerization liquid crystal molecule forms a homogeneous orientation along the photo polymerization liquid crystal molecules likewise. After that, light is irradiated on this layer to polymerize the photo polymerization liquid crystal molecules. The photo polymerization liquid crystal molecules are polymerized into a high polymer with its homogenous orientation maintained, and the dichromatic pigments are incorporated in the high polymer with its homogeneous orientation maintained likewise. Thereby, the mixture of the high polymer resulting from photo polymerization and the dichromatic pigments functions as polarizer plate 48. After that, fourth orientation film 19 was formed by spin coating. An organic molecule having an optical orientation property was used for the fourth orientation film, which was subjected to orientation processing by irradiating light thereon.

As a material of the first orientation film 15, an organic polymer of the polyimide group was used and the second orientation film 16 was form similarly. Further, as a material of the fourth orientation film 18, polyvinyl ester having paramethoxyl cinamic acid at its side-chain was used and the third orientation film 17 was form similarly. The method of forming the phase plate 47 is the same as that of the phase plate 47 of the twelfth embodiment of the invention.

Figure 21:
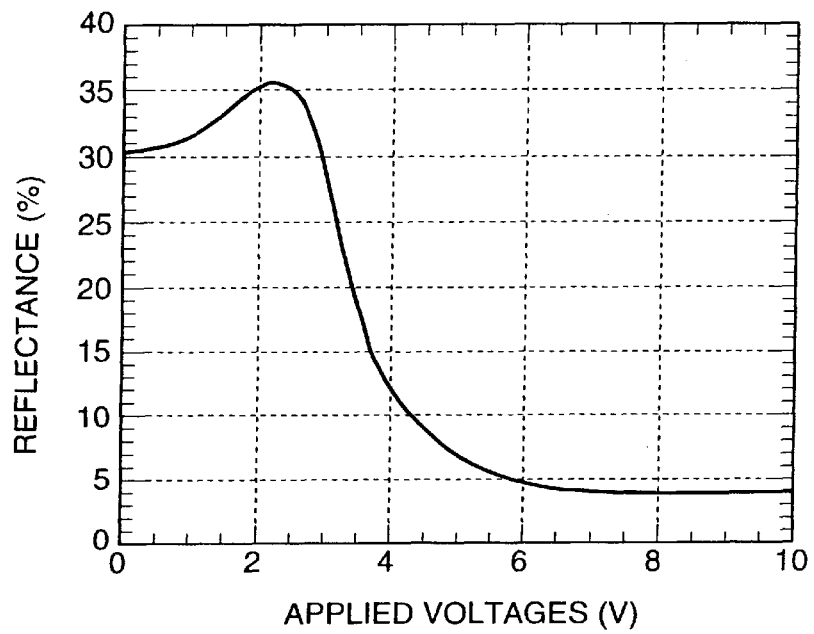
FIG. 21 is a graph indicating a relationship between the reflectance and the voltage applied to reflecting electrode 21 of a liquid crystal display apparatus according to the fourteen embodiment of the invention.

Under white light illumination of the liquid crystal display apparatus, the dependency of the reflectance on the voltages applied was measured in a gate-open condition. The result of these measurements is indicated in FIG. 21. Approximately a normally open dependency on the voltage applied was obtained. When an effective value of the voltage applied was 2.2 V, a maximum reflectance value of 36% was obtained, and at 10 V its reflectance became 4%. By driving between these two voltages, a contrast ratio of 9.0:1 was obtained.

Further, when an ac electric field was applied to the flat light source 31 at 1 kHz, with 200 V of effective value, the whole display portion of the liquid crystal display apparatus was illuminated in a yellowish orange color, and the display could be read even in a dark room. The brightness of the display under illumination was 21 cd/m$^2$. Further, the contrast ratio then was 6.1:1, which value, although about 60% of that at reflection light measurements, is sufficient in practice.

As described above, by provision of polarizer plate 48 formed on the surface on the side of the first substrate 11 near the liquid crystal layer 10, a display having an improved contrast ratio could be obtained.

Embodiment 15

Figure 22:
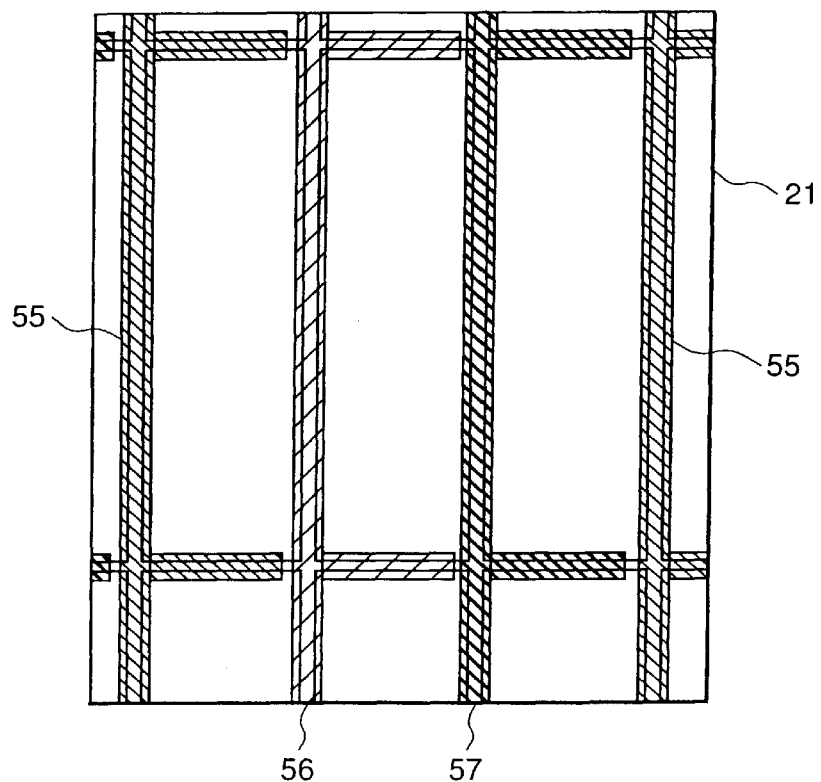
FIG. 22 is a diagram indicating patterns and positions of color converter layers 55, 56, 57 and of reflecting electrode 21 in a liquid crystal display apparatus according to a fifteenth embodiment of the invention, as observed from the normal direction of substrate 11.

A liquid crystal display apparatus according to a fifteenth embodiment of the invention will be described with reference to FIGS. 22 and 23.

The liquid crystal display apparatus according to the fifteenth embodiment of the invention is a reflection type color liquid crystal display unit provided with blue (B), green (G) and red (R) color filters 53, 52, 51. Further, light source 31 is disposed so as to have a portion inclined such that light emitted therefrom is directed to a nearby color filter. Further, color conversion layers 55, 56, 57 are disposed between the light source 31 and the color filters 53, 52, 51. These will be described more specifically in the following.

The liquid crystal display unit according to this embodiment is provided with a reflecting electrode 21, which has approximately a rectangular form with a major side of 285 μm length and a minor side of 85 μm length. There are 480 reflecting electrodes 21 arranged in a direction of the major side thereof, and 640×3 are arranged in a direction of the minor side thereof. In accordance with this arrangement, the total number of active elements 46 for supplying a voltage to reflecting electrode 21 and of through-holes for effecting connection therebetween are increased thrice in comparison with those of the liquid crystal display unit of the second embodiment. The distance between two reflecting electrodes 21 is set at 15 μm. The numerical aperture at this time is approximately 80%.

Further, the first light source electrode 22 is formed to have a comb teeth-like shape, which is disposed in a gap portion of the reflecting electrode 21. Further, a portion corresponding to each tooth of the first light source electrode 22 having the comb teeth-like shape is disposed opposite to a gap portion between two minor sides of reflecting electrodes 21. Still further, the width of the first optical source electrode 22 was set at 20 μm.

Further, a raked or inclined layer 40 was disposed between the first substrate 11 and reflection prevention layer 35, the cross-section of which is trapezoidal, in which the length of its bottom side is 50 μm, the length of its upper side is 10 μm, and the height thereof is 10 μm. As indicated in FIG. 23, the reflection prevention layer 35, the first light source electrode 22 and so on are disposed on a surface of an inclined side of the trapezoidal layer 40.

In the liquid crystal display unit of this embodiment of the invention, the laminated structure and the materials used for its construction are different from those of the preceding embodiments of the invention. Namely, as indicated in FIG. 23, in the order as observed from the side of first light emitting electrode 22, there are sequentially laminated an electron transport layer 61, light emitting layer 26, hole transport layer 62, and a hole injection layer 63, on which a second light source electrode 23 is provided.

Electron transport layer 61 was made of tris(8-xylenol) aluminum complex. Light emitting layer 26 was made of 1.4-bis(2.2-diphenylvynyl)biphenyl as a base material and 4-bis(N-ethyl)calbazolvyniyl biphenyl t 4 mol % as a mixture. Hole transfer layer 62 was made of N,N'-bis-3-methylphenyl-N,NI-diphenyl-1,1'-biphenyl-4,4'-diamine. Hole injection layer 63 was made of phthalocyanine copper complex. Each of these layers was formed by partial vapor deposition using a mask.

Further, as a material of the first light source electrode 22, magnesium and silver were used, and the electrode was formed by vapor deposition.

Still further, the flat light source 31 was surrounded by a third insulation layer 44, which was newly provided. Then, a color conversion layer 55, 56 or 57 was newly disposed at a position opposite to the second light source electrode 23 with third insulation layer 44 interposed therebetween. Color conversion layer 55, 56, 57 absorbs a blue light emitted from flat light source 31, and emits a light of red, green or blue color, respectively. A flat pattern of color conversion layers 55, 56, 57 was formed into the same comb-teeth-like pattern as that of the first light source electrode 22, and was arranged to overlap the first light source electrode 22 underneath. Therefore, color conversion layers 55, 56, 57 have a pattern to surround the gap of the reflecting electrode 21 as indicated in FIG. 22.

Color conversion layers 55, 56, 57 were made of a binder resin, which contained pigments. As a pigment for color conversion layer 55, a cyanine group pigment of 4-dicyanomethylene-2-methyl-6-(p-dimethylaminostilril)-4H-pyrane was used. As a pigment of color conversion layer 56, a coumarin group pigment of 2,3,5,6-1H, 4-H-tetrahydro-8-trifluoromethylquinoresino (9,9a,1-gh) coumarin was used. As a pigment of color conversion layer 57, a stilbene group pigment of 1,4-bis(2-methylstil)benzene was used. As a binder resin for color conversion layers 55, 56, 57, polymethylmethacrylate was used.

The pigment of color conversion layer 55 is not limited to cyanine group pigments, but pyridine group pigments, rhodamine group pigments, and oxazine group pigments can be used as well. As the pigment of color converter layer 57, coumarin group pigments can be used as well, in addition to the stilbenzen group pigment. Further, as the binder resin, a transparent resin such as polyacrylate, polycarbonate, polyvinylalchohol, etc., can be used.

Figure 24:
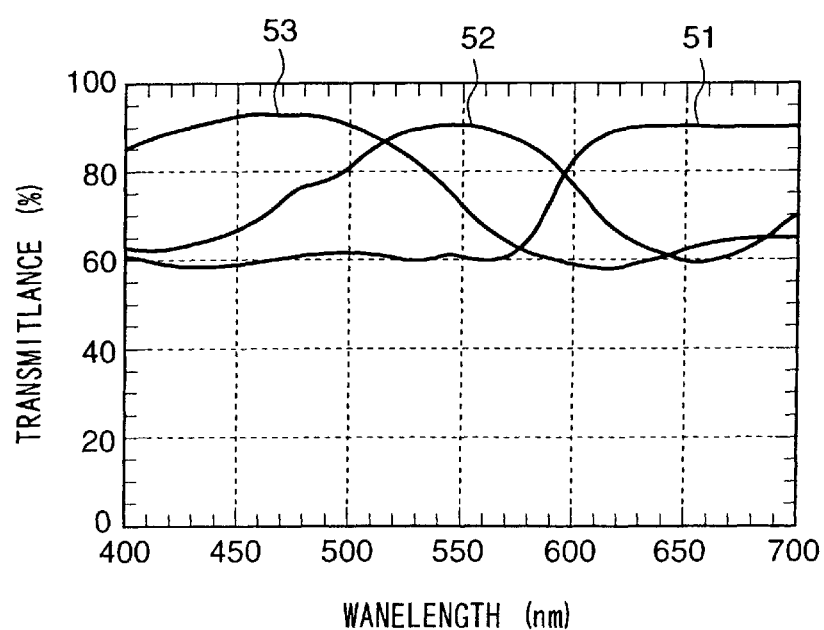
FIG. 24 is a graph indicating transmission spectra of color filters 51, 52, 53 according to the fifteenth embodiment of the invention.

Between the first insulation layer 42 and common electrode 20, stripe-like color filters 51, 52, 53 are arranged in juxtaposition to each other. Color filter 51 displays red colors, color filter 52 green colors, and color filter 53 blue colors. The longitudinal directions of these color filters 51, 52, 53 are parallel to the major side of the reflecting electrode 21. These color filters 51,52, 53 were produced by a method of pigment scattering. Their transmission spectra are indicated in FIG. 24, in which red color filter 51 has a maximum value of transmittance at 620 nm, green color filter 52 at 540 nm, and blue color filter 53 at 480 nm, respectively.

Further, as described above, because flat light source 31 is disposed on the inclined surface of the layer 40, light is emitted from flat light source 31 selectively toward its corresponding color filter placed in the vicinity thereof. Further, as for color conversion layers 55, 56, 57 of the flat light source 31, each color of light to be emitted therefrom is predetermined depending on which color filter its light is destined to enter that is disposed opposite thereto. Namely, the color conversion layer 55, through which the light of the flat light source 31 is emitted toward the red color filter 51, is made of a material that absorbs the blue light emission of flat light source 31 and outputs a red color emission. Further, the color conversion layer 56, through which the light of flat light source 31 is emitted toward the green color filter 52, is made of a material that absorbs the blue light emission of flat light source 31 and outputs a green color emission. Still further, the color conversion layer 57, through which the light of flat light source 31 is emitted toward the blue color filter 53, is made of a material that absorbs the blue light emission of flat light source 31 and outputs a blue color emission having a wavelength that is ensured to pass through the blue color filter 53 most efficiently.

Further, between the liquid crystal layer 10 and the second orientation film 16, like the twelfth embodiment of the invention, there are disposed a phase plate 47 and a third orientation film 17. Further, first orientation film 15 was made of polyvinyl ester having paramethoxyl cinamic acid as its side chain, like the third orientation film 17, and was subjected to orientation processing by irradiation of polarized ultraviolet rays. Orientation directional processing of the first orientation film 15, second orientation film 16 and third orientation film 17 was done in the same manner as the liquid crystal display unit of the twelfth embodiment of the invention. Further, the retardation of the phase plate 47 was made a quarter wavelength like that of the twelfth embodiment of the invention.

When this liquid crystal display unit was irradiated with white light, and the dependency of its reflectance on the voltages applied was measured, a normally close type dependency of reflectance on the applied voltages was obtained. Reflectances at 1 V and 10 V of effective values were 4% and 29%, respectively, and a contrast ratio of 7.2:1 was obtained when driven between these voltages. Further, when the color purity of each of the red, green and blue color displays was measured, there were obtained, in terms of the CIE chromaticity diagram, (0.422, 0.305), (0.335, 0.381) and (0.269, 0.274), respectively.

Figure 25:
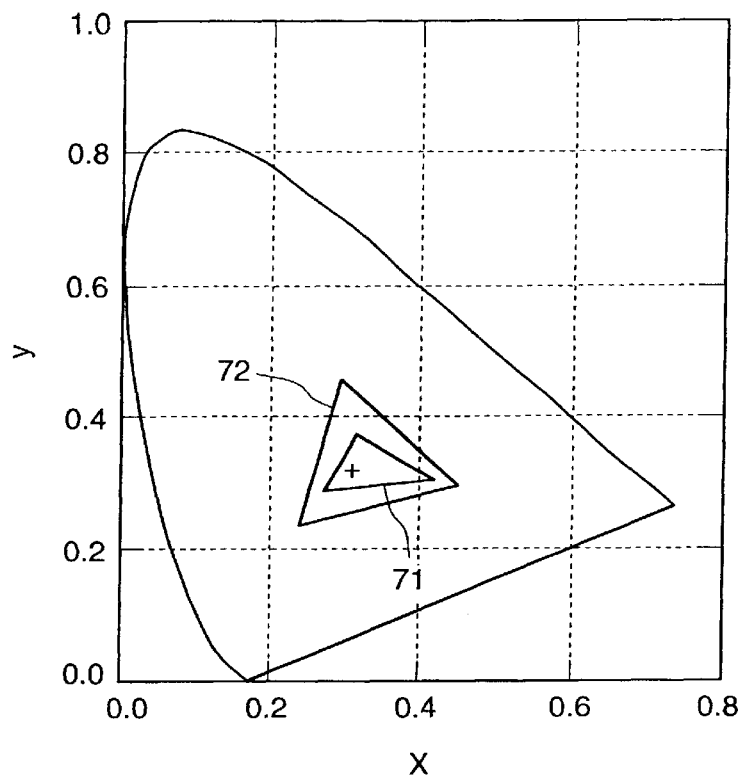
FIG. 25 is a chromaticity diagram for indicating display colors of the liquid crystal display apparatus according to the fifteenth embodiment of the invention, in which reference numerals 71 and 72 designate a color rendering area without flat light source turned on and one with a flat light source turned on, respectively.

Still further, when a dc electric field of 6 V was applied to flat light source 31 across the first light source electrode 22 as a cathode and the second light source electrode 23 as an anode, approximately the whole area of the display portion of the liquid crystal display unit was illuminated in a white color, and its display could be read even in a dark room. Brightness of illuminated display was 20 cd/m². Further, the contrast ratio was 6.0:1, which was approximately the same value as obtained under the white light irradiation. Further, when the color purity of each of the red, green, blue color displays was measured, in terms of the CIE chromaticity diagram, there were obtained (9.447, 0.296), (0.293,0.454), and (0.250, 0.237), respectively, which color purities were higher than those obtained without the light source turned on. They are plotted on a chromaticity diagram in FIG. 25, in which the area of a triangle connecting its three points was expanded when the flat light source 31 was turned on in comparison with that when the flat light source was not turned on, thereby ensuring a broader area of color display to be obtained.

Although this embodiment of the invention was described by way of example with reference to a flat light source 31 which emits blue light, and this blue light is converted to three colors of blue, green and red by color conversion layers 55, 56, 57; however, the structure of this embodiment is not limited thereto, and it may have such an arrangement that without use of the color conversion layers 55, 56, 57, three kinds of flat light sources may be provided, each flat light source being designed to emit a blue color, a green color and a red color, respectively. In this case also, for a flat light source 31 that emits light toward a red color filter 51, a flat light source that emits red light is used. Likewise, for the flat light source that emits light toward a green color filter 52, a green flat light source is used. Also, for the flat light source that emits light toward a blue color filter 53, a blue color flat light source is used. In order to provide for a blue, green, and red flat light source, the material of light emitting layer 26 is appropriately selected to be suitable for each color.

Also instead of using the color conversion layers 55, 56, 57, a flat light source that emits white light can be used as the flat light source 31.

Embodiment 16

Figure 26:
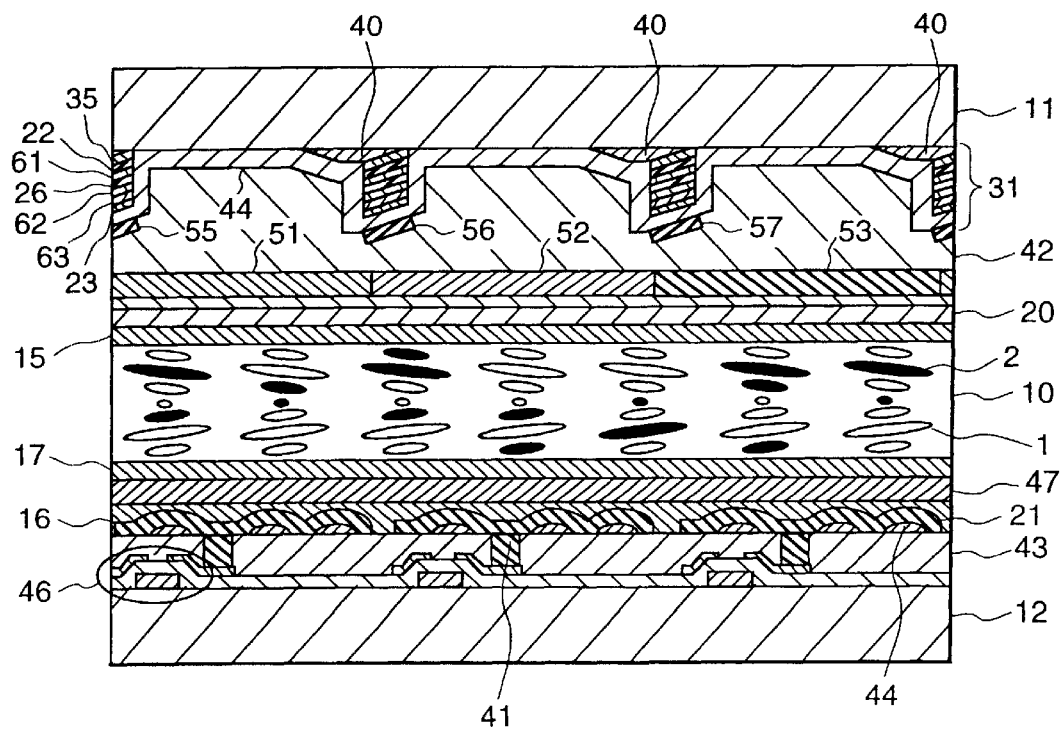
FIG. 26 is a cross-sectional view of a liquid crystal display apparatus according to a sixteenth embodiment of the invention.

A liquid crystal display apparatus according to a sixteenth embodiment of the invention will be described with reference to FIG. 26.

The liquid crystal display apparatus according to this embodiment of the invention has a structure similar to that of the fifteenth embodiment of the invention except that the arrangements of its color filters 51, 52 and 53 are modified. The color filters 51, 52, 53 thereof are disposed also on a non-aperture portion (beneath the first light source electrode 22), so as to overlap the flat light source 31 that emits light thereto.

When each color purity of red, green and blue was measured with the flat light source 31 turned on, there were obtained (0.455, 0.300), (0.293, 0.466) and (0.234, 0.227), respectively, in terms of the CIE chromaticity diagram.

By extending the disposition of color filters 51, 52, 53 as described above, and causing them to overlap a portion of the flat light source 31 corresponding thereto, as much quantity of light as possible emitted from a colored light source is ensured to pass through one of the color filters 51, 52, 53 corresponding thereto. Thereby, a range of color presentation while light source 31 was turned on could be substantially broadened in comparison with the case when it was not turned on.

Embodiment 17

Figure 27:
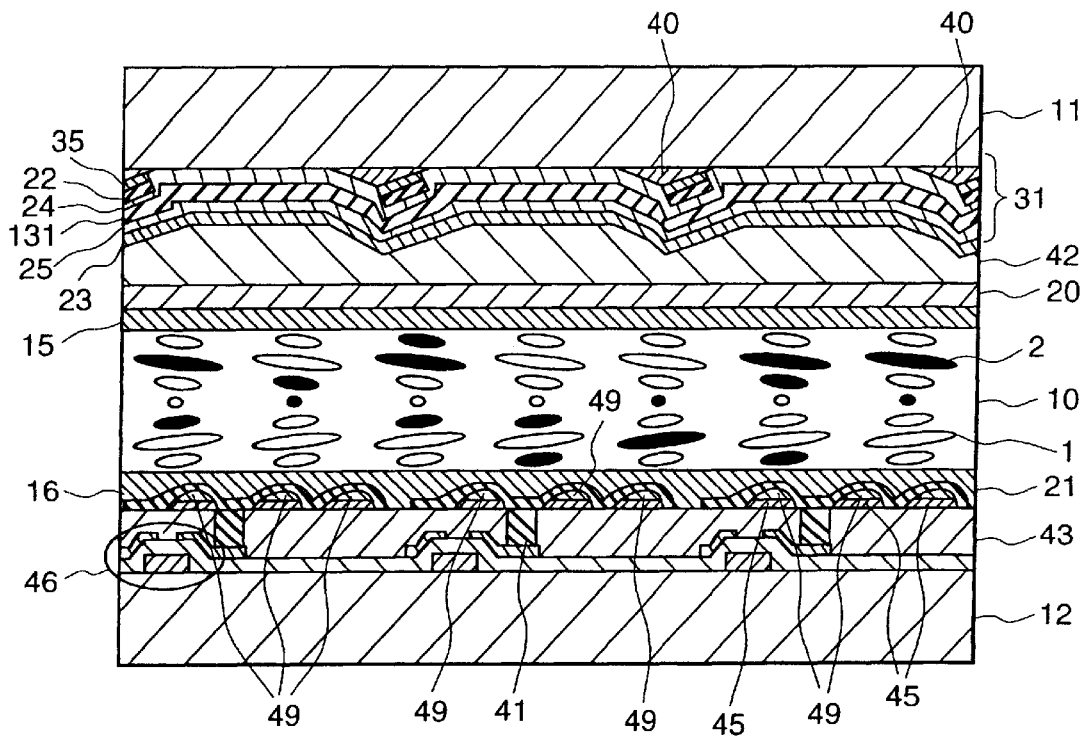
FIG. 27 is a cross-sectional view of a liquid crystal display apparatus according to a seventeenth embodiment of the invention.

A liquid crystal display apparatus according to a seventeenth embodiment of the invention will be described with reference to FIG. 27.

The liquid crystal display according to this embodiment has a similar structure to that of the liquid crystal display apparatus according to the eighth embodiment of the invention. However, it distinguishes from the eighth embodiment in that a second irregularity formed layer 49 was newly interposed between the reflecting electrode 21 and the first irregularity formed layer 45. The second irregularity formed layer 49 has its thickest portion positioned, not corresponding to the center portion of the first irregularity formed layer 45, but at a position shifted toward its end portion. As a result, while in the eighth embodiment of the invention, the shape of irregularity portion of reflecting electrode 21 was symmetrical in a horizontal direction, in the liquid crystal display unit according to this embodiment of the invention, it is asymmetrical in the horizontal direction, and is made to have the shape of an equilateral triangle toppled down sidelong. Namely, one major side and one minor side of this equilateral triangle form a raked surface of reflecting electrode 21.

The second irregularity formed layer 49 is made of a photosensitive resin of a positive type or a negative type along with the first irregularity formed layer 45. After the first irregularity formed layer 45 has been formed in a cylindrical shape, the second irregularity formed layer 49 is formed thereon to have a cylindrical shape smaller than that. Then, it is deformed by heating and formed into an equilateral triangle having a slow inclination in its cross-section as shown in FIG. 27.

Figure 28:
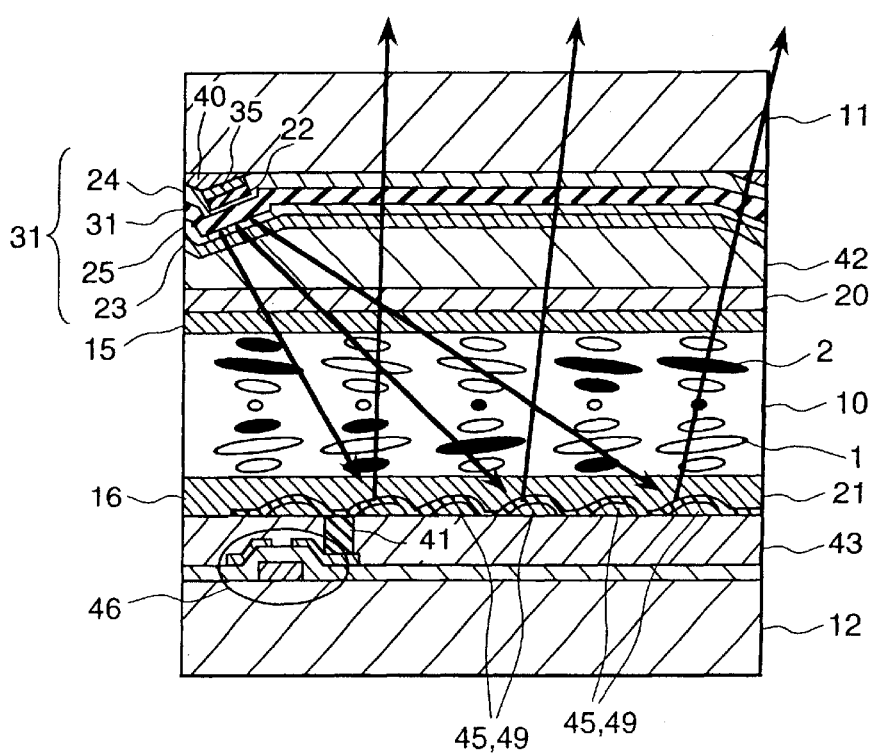
FIG. 28 is a cross-sectional view indicating paths of light emitted from a flat light source 32 in the liquid crystal display apparatus according to the seventeenth embodiment of the invention.

Thereby, reflecting electrode 21 reflects light of incidence mainly from its inclined reflection surface that corresponds to a major side of its equilateral triangle. As indicated in FIG. 27, the reflection surface corresponding to the major side of the triangle was designed to be approximately in parallel with the inclined surface of the raked layer 40 on which the flat light source 31 was mounted. Thereby, as indicated in FIG. 28, reflecting electrode 21 is allowed to reflect light from the flat light source 31 to a normal line direction of substrate 11 with an improved efficiency.

When the display area was illuminated by applying an ac electric field at 1 kHz, 200 V effective, to flat light source 31, the brightness of its illuminated display was 37 cd/m$^2$.

As described above, by provision of the second irregularity formed layer 49 between reflecting electrode 21 and the first irregularity formed layer 45, and by forming a cross section of the irregularity portions into the pattern of approximately equilateral triangles which are toppled down sidelong, most of the light emitted from the flat light source 31 is directed to the normal line direction of substrate 11, and thereby, an improved brightness higher than that of the eighth embodiment of the invention can be obtained.

Embodiment 18

A liquid crystal display apparatus according to an eighteenth embodiment of the invention will be described in the following.

The liquid crystal display apparatus according to this embodiment has an approximately similar structure to that of the seventeenth embodiment of the invention. However, it distinguishes from the seventeenth embodiment of the invention in that the patterns of the first irregularity formed layer 45 and the second irregularity formed layer 49 were modified, and that the first irregularity formed layer 45 and the second irregularity formed layer 49 were formed to have a stripe-like pattern in parallel with the flat light source. By way of example, the number of stripes within one pixel (one unit of reflecting electrode 21) was set to be 8. As to the widths of the stripes, the first irregularity formed layer 45 has a width of 9 $\mu$m, and the second irregularity formed layer 49 has a width of 4 $\mu$m. Further, like the seventeenth embodiment of the invention, the thickest portion of the second irregularity-formed layer 49 was positioned toward the edge portion of the first irregularity-formed layer 45. As a result, like the seventeenth embodiment of the invention, the cross-section of the irregularity portion of the reflecting electrode was made into approximately an equilateral triangle. Further, because such irregularity patterns thereof are disposed in a stripe-like arrangement, a slant surface portion corresponding to a major side of the equilateral triangle increases in comparison with that of the seventeenth embodiment of the invention. Therefore, the reflecting electrode 21 is allowed to more efficiently reflect the light from the flat light source in the normal line direction of the substrate 11.

Due to the stripe-like distribution of the irregularity pattern according to the invention, there is a possibility of occurrence of interference. Therefore, in order to minimize the possibility of interference, a light scattering film was pasted in the upper portion of the first substrate 11.

When the display portion was illuminated by applying an ac electric field at 1 kHz and 200 V effective to the flat light source 31, a brightness of illuminated display of 48 cd/m² was obtained.

According to this embodiment of the invention, as described above, by provision of the second irregularity formed layer 49 between the reflecting electrode 21 and the first irregularity formed layer 45, and by forming these layers in stripe-like patterns in parallel with flat light source 31, a greater portion of the light emitted from flat light source 31 will be directed in the normal line direction of substrate 11, thereby making it possible to obtain a more improved brightness than that of the liquid crystal display of the seventeenth embodiment of the invention.

Embodiment 19

Figure 29:
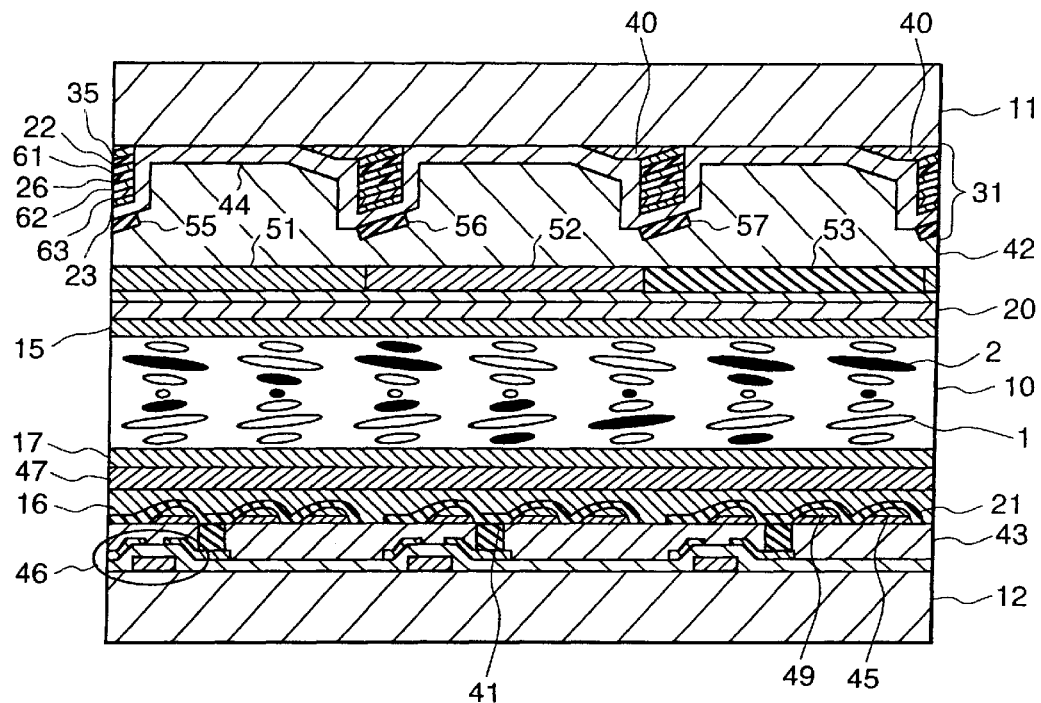
FIG. 29 is a cross-sectional view of a liquid crystal display apparatus according to a nineteenth embodiment of the invention.

With reference to FIG. 29, a liquid crystal display apparatus according to a nineteenth embodiment of the invention will be described.

The liquid crystal display apparatus according to this embodiment of the invention has a structure similar to that of the liquid crystal display of the sixteenth embodiment of the invention. However, it distinguishes from the sixteenth embodiment in that a second irregularity formed layer 49 was newly provided between the reflecting electrode 21 and the first irregularity formed layer 45. Further, the second irregularity formed layer 49, like the seventeenth embodiment, has its thickest portion shifted from its center toward the end portion of the first irregularity formed layer 45. Thereby, the cross section of the irregularities were approximately that of an equilateral triangle.

By provision of the structure as indicated in FIG. 29, light, which is emitted from the flat light source 31, converted, for example, to a red color, and then passed through red color filter 51 and further liquid crystal layer 10, can be reflected on the inclined surface of reflecting electrode 21 more efficiently toward the normal line direction of substrate 11. Thereby, because the reflected light is directed to the red color filter 51 to allow the reflected light to pass through the same color filter twice, the efficiency of light transmittance through the color filter can be improved substantially. As for the other rays of light converted to other colors, because they are allowed to pass twice through the same color filters corresponding thereto, their efficiencies of light transmittance can be improved likewise. Thereby, the color purity can be further improved.

When the color purity of each of the red, green and blue displays was measured with flat light source 31 turned on, the following color purities in terms of the CIE chromaticity diagram were obtained respectively: (0.465, 0.305), (0.286, 0.479) and (0.219, 0.227).

As described above, by provision of the second irregularity formed layer 49 between the reflecting electrode 21 and the first irregularity formed 45, and by forming the irregularities to have approximately the shape of an equilateral triangle, colored emission light, which passes through its corresponding color filter, is reflected more efficiently in the normal line direction of the substrate 11, thereby broadening the color display area when the light source 31 is turned on in comparison with that when the light source is not turned on.

Embodiment 20

A liquid crystal display apparatus according to a twentieth embodiment of the invention will be described.

In this embodiment of the invention, the first irregularity formed layer 45 and the second irregularity formed layer 49 used in the liquid crystal display apparatus of the nineteenth embodiment of the invention were modified to have the same stripe-like pattern as in the eighteenth embodiment of the invention.

Thereby, reflecting electrode 21 is allowed to reflect light from the flat light source in the normal line direction of the substrate 11 with a further improved efficiency.

Further, in order to minimize any optical interference due to a distribution of the irregularities in the stripe-like pattern, an optical scattering film was pasted in the upper portion of the first substrate 11.

When the color purity of each of the red, green and blue color displays was measured with the flat light source 31 turned on according to this embodiment, the values of (0.479, 0.305), (0.283, 0.494) and (0.209, 0.227) were obtained in terms of the CIE chromaticity diagram, thereby ensuring the display of colors with a further improved color purity.

As described above, by provision of the second irregularity formed layer 49 interposed between the reflecting electrode 21 and the first irregularity formed layer 45, and by forming this added layer into the stripe-like pattern, the color display area could be broadened still wider when used with the light source turned on, in comparison with that without the light source being turned on.

Embodiment 21

A liquid crystal display apparatus according to a twenty-first embodiment of the invention will be described.

Figure 30:
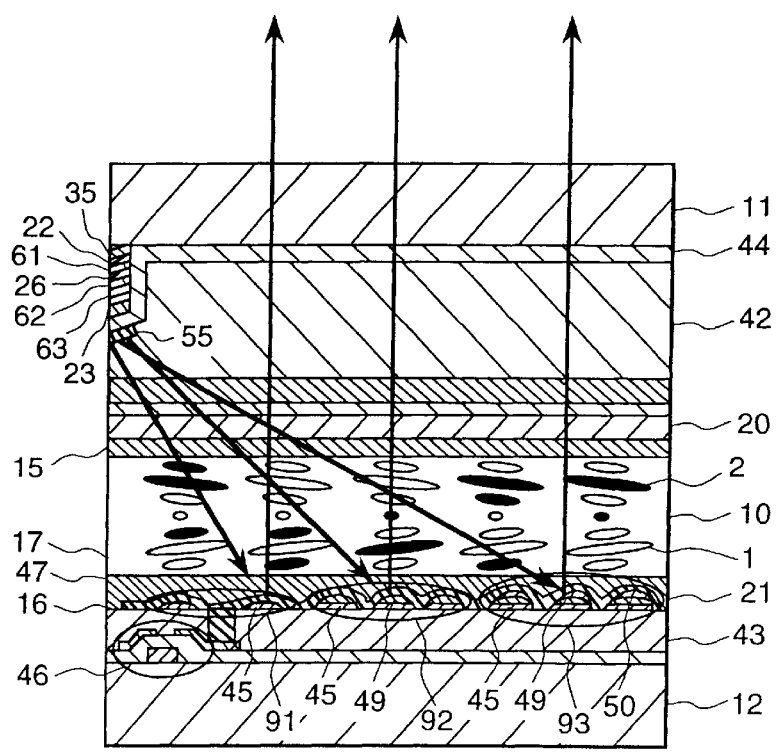
FIG. 30 is a cross-sectional view of a liquid crystal display apparatus according to a twenty-first embodiment of the invention, showing paths of light emitted from flat light source 31, in which reference numeral 99 designates a light scattering film.

With reference to FIG. 30, the liquid crystal display apparatus according to this embodiment has a structure similar to that of the twentieth embodiment of the invention; however, it distinguishes from the latter in that the shape of each of the irregularities of the irregularity formed layer is caused to have a distribution in the structure within a unit pixel (a unit reflecting electrode 21) depending on its distance from the flat light source 31.

Namely, among eight stripes provided within one pixel, two stripes in the vicinity of the flat light source 31 corresponding thereto are assigned to a first irregularity group 91, the next three stripes are assigned to a second irregularity group 92, and the subsequent three stripes remotest from the light source are assigned to a third irregularity group 93. Then, the first irregularity group 91 was formed only by first irregularity formed layer 45, the width of which was set at 9 μm. The second irregularity group 92 was formed by the first irregularity formed layer 45 and a second irregularity formed layer 49, the widths of which were set at 9 μm and 4 μm, respectively. The third irregularity group 93 was formed by the first irregularity formed layer 45, the second irregularity formed layer 49 and a third irregularity formed layer 50, widths of which were set at 9 μm, 5 μm and 2 μm, respectively.

They were heated and formed to have cross-sections in the shape of approximately equilateral triangles with a toppled down side. The inclination of each of the irregularity formed groups 91, 92, 93 differs from each other. In terms of respective angles of inclined surfaces of respective irregularity groups 91, 92, 93 on the side thereof facing the flat light source 31 corresponding thereto, it is noted that the first irregularity group 91 has almost mild inclination, the third irregularity group 93 has the steepest inclination, and the second irregularity group 92 has a medium inclination between these two. It is apparent that the nearer to the flat light source corresponding thereto, the smaller the angle of inclination becomes.

It would be most ideal to be able to realize a mirror reflection of all components of light from its corresponding flat light source 31 in the normal line direction of the substrate 11. For the purpose of realizing a mirror reflection, it is necessary to vary the angle of inclination of each reflection surface depending on its distance from the flat light source 31 corresponding thereto. Therefore, according to this embodiment of the invention, by varying the angle of inclination of the reflection surface in three stages depending on its distance from the corresponding flat light source, a mirror reflection condition can be satisfied almost all over one pixel.

As a result, it is ensured that the reflection electrode 21 will reflect the light emitted from red color conversion layer 55 and passed through red color filter 51 more selectively toward the red color filter 51 in the direction of normal line relative to the plane of the substrate. As for the green color converted and blue color converted components of light, the same effect described above can be achieved.

In this liquid crystal display apparatus according to the twenty-first embodiment, when the color purity of each of the red, green and blue color displays was measured with the flat light source 31 turned on, there were obtained, in terms of the CIE chromaticity diagram, values of (0.488, 0.304), (0.280, 0.499) and (0.202, 0.223), respectively, thereby enabling color displays to be achieved with an even greater improvement in color purity.

As described above, by varying the angle of inclination of the reflection electrode 21 in three stages in accordance with the distance from its corresponding flat light source 31, the colored light which has passed through a corresponding color filter will be reflected in the normal line direction of the substrate with a further improved efficiency, thereby further broadening the extent of color display when the light source is turned on, in comparison with that without the light source being turned on.

Embodiment 22

A liquid crystal display apparatus according to a twenty-second embodiment of the invention will be described.

The liquid crystal display apparatus according to this embodiment of the invention has a structure similar to that of the liquid crystal display apparatus of the first embodiment of the invention except that it differs therefrom in that instead of the reflecting electrode 21 and the first irregularity formed layer 45, a transparent electrode made of ITO was used. Further, a backlight was disposed in the lower direction of the second substrate 12. The backlight is comprised of a fluorescent lamp, a light guide plate, and a light scattering plate. The light scattering plate has a function to reflect its light toward the user when the flat light source 31 is turned on.

When the backlight is turned on, a display with a white color background is obtained, and when the flat light source 31 is turned on, a display with a yellowish orange color background is obtained.

As described above, by provisions of the back-light and the flat light source, and by switching its light source between these two light sources, two kinds of displays with a different background color are provided.

Embodiment 23

In a liquid crystal display apparatus according to a twenty-third embodiment of the invention, the reflecting electrode 21 and the first irregularity formed layer 45 provided in the first embodiment of the invention were removed, and instead, a transparent electrode made of ITO was used. Further, a reflection plate was disposed in the lower direction of the second substrate 12. The reflection plate is formed by vapor deposition of aluminum on a resin film. On the surface of the resin film, irregularities were formed by a die press process, thereby giving a light scattering property to the reflection plate.

When a light is irradiated on this liquid crystal display apparatus from a vertical direction, substantially the same contrast ratio as that of the first embodiment is obtained. Further, when the flat light source 31 was turned on, a yellowish orange background color display was obtained.

As described above, also in this structure of the invention, in which the reflection plate was disposed outside its liquid crystal cell, almost the same result was obtained as that by the built-in type reflection plate.

Comparison 1

A first comparison example was prepared, in which the first light source electrode provided in the liquid crystal display apparatus of the first embodiment was made of a transparent electrode made of ITO, and the reflection prevention layer 35 was removed therefrom. Further, the first light source electrode 22 was not formed into a matrix pattern, but was disposed all over the display portion.

Its contrast ratio when the flat light source 31 was not turned on decreased to 2.6:1, and when the flat light source 31 was turned on further decreased to 2.1:1.

This is because, by provision of the transparent electrode all over the display portion, the number of interfaces present in the aperture portion increased thereby increasing the interfacial reflection accordingly; hence, when the flat light source 31 was not turned on, the contrast ratio decreased in comparison with that of the first embodiment of the invention. Further, by distribution of the transparent electrode on the whole area of the display portion, a part of the light emitted from the flat light source 31 is caused directly to advance in the direction of the user. This part of the light directly advancing toward the user was not subjected to modulation by the liquid crystal layer 10; therefore, a constant quantity of light is always directed to the user regardless of whether it is a bright display or a dark display. Hence, its contrast ratio when the flat light source 31 was turned on decreased substantially.

Comparison 2

A second comparison example was prepared by providing the first light source electrode 22 made of a transparent electrode made of ITO in the liquid crystal display apparatus of the first embodiment of the invention, and by removing the reflection prevention plate therefrom. Further, the first light source electrode 22 was not distributed in a matrix pattern, but was distributed on the whole area of the display portion.

Its contrast ratio when the flat light source was not turned on decreased to 2.7:1, and when the flat light source was turned on the contrast ratio further decreased to 2.3:1.

The reason for the decreases in contrast ratios was the same as in the first comparison example.

As described hereinabove, according to the invention, a novel liquid crystal display apparatus is provided, which, although it is a reflection type liquid crystal display apparatus, features a high contrast ratio.

What is claimed is:

1. A liquid crystal display apparatus comprising a liquid crystal layer, upper and lower substrates interposing said liquid crystal layer therebetween, a pair of electrodes for applying an electric field to said liquid crystal layer, a reflection plate disposed beneath said liquid crystal layer for reflecting light coming from an upper direction of said liquid crystal layer and passing therethrough toward said liquid crystal layer, and a light emitting element layer for emitting light to said liquid crystal layer, wherein said light emitting element layer is disposed in an upper direction of said liquid crystal layer so as to overlay a display portion of said liquid crystal layer, one electrode of said pair of electrodes which is disposed on said lower substrate is divided into portions corresponding to each pixel of said liquid crystal layer, and an other electrode of said pair of electrodes which is disposed on said upper substrate is disposed between said one electrode and said light emitting element layer, and said light emitting element layer has a stripe-like light emitting portion, disposed in a position corresponding to a gap between said divided portions of said one electrode.

2. A liquid crystal display apparatus according to claim 1 wherein said light emitting element layer has a reflection layer for deflecting light emitted in an upper direction from said stripe-like light emitting portion to said liquid crystal layer.

3. A liquid crystal display apparatus according to claim 2 wherein said light emitting element layer comprises a reflection prevention layer that covers an upper surface of said reflection layer for preventing said upper surface of said reflection layer from reflecting external light.

4. A liquid crystal display apparatus according to claim 2 wherein said reflection layer in said light emitting element layer functions also as an electrode for applying an electric field to said light emitting portion.

5. A liquid crystal display apparatus according to claim 1 wherein said light emitting element layer comprises a light emitting layer, and a pair of light emitting electrode layers that interpose said light emitting layer therebetween for applying a voltage to said light emitting layer, and wherein at least one of said pair of light emitting electrode layers is formed to have a stripe-like pattern in order to form said light emitting portion in a stripe-like pattern.

6. A liquid crystal display apparatus according to claim 5 wherein said light emitting layer is formed to have the same pattern as said stripe-like pattern of said light emitting electrode layer.

7. A liquid crystal display apparatus according to claim 1 wherein said light emitting element layer comprises a light emitting layer and a pair of light emitting electrode layers interposing said light emitting layer therebetween for applying a voltage to said light emitting layer, and wherein said light emitting layer, which is distributed on a whole area of a display portion of said liquid crystal layer, is transparent to its own light of emission.

8. A liquid crystal display apparatus according to claim 5, wherein at least one, in a lower portion, of said pair of light emitting electrode layers is transparent to a light of emission from said light emitting layer.

9. A liquid crystal display apparatus according to claim 1 wherein said light emitting element layer comprises a light emitting layer, and a pair of light emitting electrode layers interposing said light emitting layer therebetween for applying a voltage to said light emitting layer, and wherein a portion of said light emitting layer that is interposed between said pair of light emitting electrode layers has a main surface that is inclined relative to a main surface of said substrate.

10. A liquid crystal display apparatus according to claim 1 wherein said light emitting element layer is disposed between said upper substrate and said liquid crystal layer, and further between said light emitting element layer and said liquid crystal layer, there is disposed a color filter.

11. A liquid crystal display apparatus according to claim 1 wherein said color filter comprises a red color filter, a blue color filter and a green color filter that are arranged horizontally relative to a main plane, and wherein said light emitting portion of said light emitting element layer comprises a red light emitting portion, a blue light emitting portion and a green light emitting portion, said red light emitting portion being disposed in the vicinity of said red color filter, said blue light emitting portion being disposed in the vicinity of said blue color filter, and said green light emitting portion being disposed in the vicinity of said green color filter.

12. A liquid crystal display apparatus according to claim 11, wherein said light emitting element layer comprises a light emitting layer and a pair of light emitting electrode layers disposed such as to interpose said light emitting layer therebetween for applying a voltage to said light emitting layer, and wherein a front plane of the light emitting layer of said red light emitting portion is directed to said red color filter in order to ensure that its light will be emitted to said red color filter, a front plane of the light emitting layer of said blue light emitting portion is directed to said blue color filter in order to ensure that its light will be emitted to said blue color filter, and a front plane of the light emitting layer of said green light emitting portion is directed to said green color filter in order to ensure that its light will be emitted to said green color filter.

13. A liquid crystal display apparatus according to claim 12, wherein each of said red light emitting portion, said blue light emitting portion and said green light emitting portion comprises a light emitting layer, a pair of light emitting electrode layers disposed so as to interpose said light emitting layer therebetween for applying a voltage to said light emitting layer, and a color conversion layer for converting light emitted from said light emitting layer to a red light, a blue light or a green light.

14. A liquid crystal display apparatus according to claim 1 wherein said light emitting element layer is disposed between said upper substrate and said liquid crystal layer, and an insulation layer is disposed between said light emitting element layer and said liquid crystal layer.

15. A liquid crystal display apparatus according to claim 14, wherein said insulation layer contains fine particles for scattering its light.

16. A liquid crystal display apparatus according to claim 1 wherein said reflection plate has irregularities formed on its surface for scattering, at its reflection, a light entered through said liquid crystal layer.

17. A liquid crystal display apparatus according to claim 16 wherein respective reflecting surfaces of the irregularities formed on said reflection plate are formed asymmetrically in order selectively to reflect a light from the light emitting portion of said light emitting element layer in the vicinity thereof in a direction of a normal line of said substrate.

18. A liquid crystal display apparatus according to claim 17, wherein respective reflecting surfaces of the irregularities formed on said reflection plate have a different angle of inclination in accordance with the distance from the light emitting portion of said light emitting element layer in the vicinity thereof.

19. A liquid crystal display apparatus according to claim 1 wherein said light emitting portion formed in the stripe-like pattern is arranged in a matrix or comb-teeth stripe-like pattern.

20. A liquid crystal display apparatus according to claim 1 wherein said light emitting element layer emits light by electroluminescence.

21. A liquid crystal display apparatus according to claim 7 wherein at least one, in a lower portion, of said pair of light emitting electrode layers is transparent to a light of emission from said light emitting layer.

* * * * *